(12) United States Patent
Noh et al.

(10) Patent No.: US 10,177,627 B2
(45) Date of Patent: Jan. 8, 2019

(54) HOMOPOLAR, FLUX-BIASED HYSTERESIS BEARINGLESS MOTOR

(71) Applicant: Massachusetts Institute of Technology, Cambridge, MA (US)

(72) Inventors: Minkyun Noh, Cambridge, MA (US); David L. Trumper, Plaistow, MA (US)

(73) Assignee: MASSACHUSETTS INSTITUTE OF TECHNOLOGY, Cambridge, MA (US)

( * ) Notice: Subject to any disclaimer, the term of this patent is extended or adjusted under 35 U.S.C. 154(b) by 215 days.

(21) Appl. No.: 15/227,256

(22) Filed: Aug. 3, 2016

(65) Prior Publication Data

US 2017/0040868 A1 Feb. 9, 2017

Related U.S. Application Data

(60) Provisional application No. 62/201,661, filed on Aug. 6, 2015.

(51) Int. Cl.
| | |
|---|---|
| *H02K 19/08* | (2006.01) |
| *H02K 7/09* | (2006.01) |
| *H02K 19/10* | (2006.01) |
| *H02K 5/128* | (2006.01) |
| *H02K 7/14* | (2006.01) |
| *F04D 13/06* | (2006.01) |

(Continued)

(52) U.S. Cl.
CPC ............. *H02K 7/09* (2013.01); *F04D 13/064* (2013.01); *F04D 25/0606* (2013.01); *F04D 29/048* (2013.01); *F04D 29/058* (2013.01); *H02K 5/128* (2013.01); *H02K 7/14* (2013.01); *H02K 19/08* (2013.01); *H02K 19/106* (2013.01); *H02K 11/20* (2016.01)

(58) Field of Classification Search
CPC ................................ H02K 19/08; H02K 7/09
USPC ................................................. 310/90.5, 178
See application file for complete search history.

(56) References Cited

U.S. PATENT DOCUMENTS

| | | |
|---|---|---|
| 3,467,844 A | 9/1969 | Bird |
| 3,694,041 A | 9/1972 | Studer |

(Continued)

FOREIGN PATENT DOCUMENTS

| | | |
|---|---|---|
| CN | 103501064 A | 1/2014 |
| JP | S 5883563 A | 5/1983 |

(Continued)

OTHER PUBLICATIONS

W.Gruber et al. "Design of a Novel Homopolar Bearingless Slice Motor with Reluctance Rotor", IEEE Transactions on Industry Applications, vol. 51, No. 2, Mar./Apr. 2015, pp. 1456-1463.*

(Continued)

*Primary Examiner* — Burton Mullins
(74) *Attorney, Agent, or Firm* — Daly, Crowley, Mofford & Durkee, LLP

(57) ABSTRACT

Described is a bearingless motor based upon a homopolar flux-biased magnetic bearing for force generation and a hysteresis motor for torque generation. The bearingless slice motor levitates and rotates a ring-shaped rotor made of a semi-hard magnetic material. The rotor is biased with a homopolar permanent-magnetic flux, on which 2-pole flux can be superimposed to generate suspension forces. Torque is generated by a hysteretic coupling between the rotor and a rotating multi-pole stator field.

41 Claims, 20 Drawing Sheets

(51) Int. Cl.
*F04D 25/06* (2006.01)
*F04D 29/048* (2006.01)
*F04D 29/058* (2006.01)
*H02K 11/20* (2016.01)

(56) References Cited

U.S. PATENT DOCUMENTS

| | | |
|---|---|---|
| 3,865,442 A | 2/1975 | Studer |
| 3,891,879 A | 6/1975 | Yamada et al. |
| 4,000,929 A | 1/1977 | Studer |
| 4,072,370 A | 2/1978 | Wasson |
| 4,077,678 A | 3/1978 | Studer et al. |
| 4,381,875 A | 5/1983 | Studer |
| 4,387,935 A | 6/1983 | Studer |
| 4,454,438 A | 6/1984 | Yamashita et al. |
| 4,634,191 A | 1/1987 | Studer |
| 4,841,204 A | 6/1989 | Studer |
| 4,885,489 A | 12/1989 | Stuhr |
| 5,142,932 A | 9/1992 | Moya et al. |
| 5,187,401 A | 2/1993 | Rahman |
| 5,581,139 A | 12/1996 | Toukola |
| 5,695,471 A | 12/1997 | Wampler |
| 5,708,346 A | 1/1998 | Schob |
| 5,758,709 A | 6/1998 | Boyd, Jr. |
| 5,844,339 A | 12/1998 | Schroeder et al. |
| 5,939,813 A | 8/1999 | Schob |
| 6,015,272 A | 1/2000 | Antaki et al. |
| 6,029,336 A | 2/2000 | Kliman et al. |
| 6,053,705 A | 4/2000 | Schob et al. |
| 6,078,119 A | 6/2000 | Satoh et al. |
| 6,130,494 A | 10/2000 | Schob |
| 6,171,078 B1 | 1/2001 | Schob |
| 6,175,178 B1 | 1/2001 | Tupper et al. |
| 6,181,040 B1 | 1/2001 | Schob |
| 6,220,832 B1 | 4/2001 | Schob |
| 6,222,290 B1 | 4/2001 | Schob et al. |
| 6,227,817 B1 | 5/2001 | Paden |
| 6,234,772 B1 | 5/2001 | Wampler et al. |
| 6,244,835 B1 | 6/2001 | Antaki et al. |
| 6,278,251 B1 | 8/2001 | Schob |
| 6,297,574 B1 | 10/2001 | Schob et al. |
| 6,351,048 B1 * | 2/2002 | Schob ............... F16C 32/0444 310/68 B |
| 6,359,357 B1 | 3/2002 | Blumenstock |
| 6,365,996 B2 | 4/2002 | Schob |
| 6,394,769 B1 | 5/2002 | Bearnson et al. |
| 6,447,265 B1 | 9/2002 | Antaki et al. |
| 6,447,266 B2 | 9/2002 | Antaki et al. |
| 6,559,567 B2 | 5/2003 | Schob |
| 6,575,717 B2 | 6/2003 | Ozaki et al. |
| 6,580,546 B2 | 6/2003 | Liu et al. |
| 6,640,617 B2 * | 11/2003 | Schob ............... A61M 1/101 73/54.01 |
| 6,688,861 B2 | 2/2004 | Wampler |
| 6,733,171 B2 | 5/2004 | Schob |
| 6,864,084 B2 * | 3/2005 | Schob ............... C12M 21/08 435/1.2 |
| 6,879,074 B2 | 4/2005 | Amrhein et al. |
| 6,898,984 B2 | 5/2005 | Schob |
| 7,112,903 B1 | 9/2006 | Schob |
| 7,467,930 B2 | 12/2008 | Ozaki et al. |
| 7,470,246 B2 | 12/2008 | Mori et al. |
| 7,525,229 B1 | 4/2009 | Willig et al. |
| 7,682,301 B2 | 3/2010 | Wampler et al. |
| 7,683,514 B2 | 3/2010 | Onuma et al. |
| 7,719,151 B2 | 5/2010 | Tremaudant et al. |
| 7,859,156 B2 | 12/2010 | Nusser et al. |
| 7,934,909 B2 | 5/2011 | Nuesser et al. |
| 7,963,228 B2 | 6/2011 | Studer |
| 7,977,838 B2 | 7/2011 | Onuma |
| 8,004,137 B2 | 8/2011 | Studer |
| 8,226,373 B2 | 7/2012 | Yaegashi |
| 8,282,269 B2 | 10/2012 | Terentiev |
| 8,288,906 B2 | 10/2012 | Onuma |
| 8,366,599 B2 | 2/2013 | Tansley et al. |
| 8,430,652 B2 | 4/2013 | Yaegashi et al. |
| 8,471,426 B2 | 6/2013 | Petro et al. |
| 8,496,874 B2 | 7/2013 | Gellman et al. |
| 8,581,462 B2 * | 11/2013 | Nussbaumer ........... H02K 7/09 310/156.01 |
| 8,581,559 B2 | 11/2013 | Botts |
| 8,668,473 B2 | 3/2014 | LaRose et al. |
| 8,747,293 B2 | 6/2014 | Arndt et al. |
| 8,807,968 B2 | 8/2014 | Wampler et al. |
| 8,834,342 B2 | 9/2014 | Wampler et al. |
| 9,835,158 B2 * | 12/2017 | Schob ............... F04D 1/006 |
| 2002/0094281 A1 | 7/2002 | Khanwilkar et al. |
| 2005/0135942 A1 | 6/2005 | Wood et al. |
| 2005/0135948 A1 | 6/2005 | Olsen et al. |
| 2007/0193635 A1 * | 8/2007 | Hahn ............... F04D 7/045 137/565.17 |
| 2007/0193835 A1 | 8/2007 | Hahn et al. |
| 2007/0216251 A1 | 9/2007 | Shim et al. |
| 2008/0199357 A1 | 8/2008 | Gellman et al. |
| 2009/0041595 A1 | 2/2009 | Garzaniti et al. |
| 2010/0231076 A1 | 9/2010 | Chiba et al. |
| 2011/0237863 A1 | 9/2011 | Ricci et al. |
| 2013/0022481 A1 | 1/2013 | Schob et al. |
| 2013/0164161 A1 | 6/2013 | Schob |
| 2013/0330219 A1 | 12/2013 | LaRose et al. |
| 2013/0343927 A1 | 12/2013 | Ramdane et al. |
| 2013/0343954 A1 * | 12/2013 | Gartner ............... A61M 1/1698 422/48 |
| 2014/0023534 A1 | 1/2014 | Ramdane et al. |
| 2014/0046118 A1 | 2/2014 | LaRose et al. |
| 2014/0062239 A1 * | 3/2014 | Schoeb ............... H02K 7/09 310/90.5 |
| 2014/0171727 A1 | 6/2014 | Nusser et al. |
| 2014/0179983 A1 | 6/2014 | LaRose et al. |
| 2014/0187852 A1 | 7/2014 | Peters et al. |
| 2014/0199179 A1 | 7/2014 | Da Silva et al. |
| 2014/0205434 A1 | 7/2014 | Graichen |
| 2014/0252899 A1 | 9/2014 | Looser |
| 2014/0252900 A1 * | 9/2014 | Mandes ............... H02K 21/36 310/154.29 |
| 2014/0262900 A1 | 9/2014 | Mandes |
| 2015/0352265 A1 | 12/2015 | Garimella et al. |

FOREIGN PATENT DOCUMENTS

| | | |
|---|---|---|
| JP | H04235724 A | 8/1992 |
| RU | 2013139210 A | 2/2015 |
| WO | WO 2007/140504 A1 | 12/2007 |
| WO | WO 2017/218987 A1 | 12/2017 |

OTHER PUBLICATIONS

Allaire, et al.; "Blood Flow in a Continuous Flow Ventricular Assist Device;" Artificial Organs; 23(8); Blackwell Science, Inc.; International Society for Artificial Organs; Aug. 1999; pp. 769-773; 5 pages.

Allaire, et al.; "Low Power Magnetic Bearing Design for High Speed Rotating Machinery;" International Symposium on Magnetic Suspension Technology (1992); Part 1; pp. 317-329; 12 pages.

AlOmari, et al.; "Developments in Control Systems for Rotary Left Ventricular Assist Devices for Heart Failure Patients; a Review;" IOP Publishing; Physiological Measurement; vol. 1; Jan. 2013; pp. R1-R27; 28 pages.

Ammar, et al.; "The ABCs of Left Ventricular Assist Device Echocardiography: a Systematic Approach;" European Heart Journal—Cardiovascular Imaging; May 10, 2012; 15 pages.

Barletta, et al; "Design of a Bearingless Blood Pump;" Int'l Symposium on Magnetic Suspension Techniques; (1996) Part 1; pp. 265-275; 10 pages.

Baumgartner et al.; "Multivariable State Feedback Control of a 500 000 rpm Self-Bearing Motor;" IEEE International Electric Machines Drives Conference (IEMDC) 2013; pp. 347-353; 7 pages.

Baumgartner, et al.; "Novel High-Speed, Lorentz-Type, Slotless Self-Bearing Motor;" IEEE Energy Conversion Congress & Exposition (ECCE); 2010; pp. 3971-3977; 7 pages.

Bearnson, et al.; "HeartQuest Ventricular Assist Device Magnetically Levitated Centrifugal Blood Pump;" Artificial Organs; Inter-

(56) References Cited

OTHER PUBLICATIONS national Center for Artificial Organs and Transplantation; vol. 30; No. 5; 2006; pp. 339-346; 8 pages.

Bichsel; "The Bearingless Electrical Machine;" Nasa Langley Research Center; International Symposium on Magnetic Suspension Technology; Part 2; N92-27793; 1992; pp. 561-573; 12 pages.

Bourque, et al.; "HeartMate III: Pump Design for a Centrifugal LVAD with a Magnetically Levitated Rotor;" ASAIO Journal 2001; pp. 401-405; 5 pages.

Chen, et al.; "A Magnetic Suspension Theory and It's Application to the HeartQuest Ventricular Assist Device;" Artificial Organs; International Society for Artificial Organs; vol. 26; No. 11; 2002; pp. 947-951; 5 pages.

Chiba, et al.; "Radial Force in a Bearingless Reluctance Motor;" IEEE Transactions on Magnetics; vol. 27; No. 2; Mar. 1991; pp. 786-790; 5 pages.

Copeland, et al.; "An Analysis of the Hysteresis Motor I—Analysis of the Idealized Machine;" IEEE Transactions on Power Apparatus and Systems; vol. 82; No. 65; Apr. 1963; pp. 34-42; 9 pages.

Copeland, et al.; "An Analysis of the Hysteresis Motor II—The Circumferential-Flux Machine;" IEEE Transactions on Power Apparatus and Systems; vol. 83; No. 6; pp. 619-625; Jun. 1964; 7 pages.

Esmore, et al.; "VentrAssist™ Left Ventricular Assist Device: Clinical Trial Results and Clinical Development Plan Update;" European Journal of Cardio-Thoracic Surgery; vol. 32; No. 5; Nov. 2007; pp. 735-744; 10 pages.

Farrar, et al.; "Design Features, Developmental Status, and Experimental Results with the Heartmate III Centrifugal Left Ventricular Assist System with a Magnetically Levitated Rotor;" ASAIO Journal 2007; vol. 53; No. 3; May 2007; pp. 310-315; 6 pages.

Goldowsky; "Magnevad—The World's Smallest Magnetic-bearing Turbo Pump;" Artificial Organs; International Center for Artificial Organs and Transplantation; vol. 28; No. 10; 2004; pp. 945-952; 8 pages.

Goldowsky, et al.; "Magnevad Status of Design Improvements Human Blood Results and Preliminary Sheep Trial;" Artificial Organs; vol. 29; No. 10; 2005; pp. 855-857; 6 pages.

Grochmal, et al.; "Control of a Self-Bearing Servomotor;" IEEE Control Systems Magazine; vol. 29; No. 5; Oct. 2009; pp. 74-92; 19 pages.

Gruber, et al.; "Bearingless Slice Motor Concepts without Permanent Magnets in the Rotor;" IEEE International Conference on Industrial Technology (ICIT); 2013; pp. 259-265; 7 pages.

Gruber; "Bearingless Slice Motors: General Overview and the Special Case of Novel Magnet-Free Rotors;" Innovative Small Drivers and Micro-Motor Systems; GMM/ETG Symposium; Sep. 19-20, 2013; pp. 116-121; 6 pages.

Gruber, et al.; "Design of a Bearingless Flux-Switching Slice Motor;" The 2014 International Power Electronics Conference; 2014; pp. 1691-1696; 6 pages.

Gruber, et. al; "Design of a Novel Homopolar Bearingless Slice Motor with Reluctance Rotor;" IEEE Transactions on Industry Applications; vol. 51; No. 2; Mar./Apr. 2015; pp. 1456-1464; 9 pages.

Hassani, et al.; "A Survey on Hysteresis Modeling, Identification and Control;" Mechanical Systems and Signal Processing 49; Dec. 2014; pp. 209-233; 25 pages.

Hetzer, et al.; "First Experiences with a Novel Magnetically Suspended Axial Flow Left Ventricular Assist Device;" European Journal of Cardio-Thoracic Surgery; vol. 25; No. 6; Jun. 2004; pp. 964-970; 7 pages.

Hoshi, et al.; "Third-Generation Blood Pumps with Mechanical Noncontact Magnetic Bearings;" Artificial Organs; International Center for Artificial Organs and Transplantation; vol. 30; No. 5; 2006; pp. 324-338; 15 pages.

Ichikawa, et al.; "Inherently Decoupled Magnetic Suspension in Homopolar-Type Bearingless Motors;" IEEE Transactions on Industry Applications; vol. 37; No. 6; Nov./Dec. 2001; pp. 1668-1674; 7 pages.

Imoberdorf, et al.; "Combined Radial-Axial Magnetic Bearing for a 1kW, 500,000 rpm Permanent Magnet Machine;" APEC 2007; Twenty Second Annual IEEE Applied Power Electronics Conference; 2007; pp. 1434-1400; 7 pages.

Kafagy, et al.; "Axial Flow Artificial Heart Blood Pumps: A Brief Review;" Trends Biomater; vol. 27; No. 3; Jul. 2013; pp. 124-130; 8 pages.

Kanebako, et al.; "New Design of Hybrid-Type Self-Bearing Motor for Small, High-Speed Spindle;" IEEE/ASME Transactions on Mechatronics; vol. 8; No. 1; Mar. 2003; pp. 111-119; 9 pages.

Kashiwa, et al.; "Left Heart Bypass Support with the Rotaflow Centrifugal Pump as a Bridge to Decision and Recovery in an Adult;" Artificial Organs; vol. 15; No. 2; Jun. 2012; pp. 207-210 (4 pages).

Kuwajima, et al.; "An Estimation of the Rotor Displacements of Bearingless Motors Based on a High Frequency Equivalent Circuit;" 2001 $4^{th}$ IEEE Int'l Conference on Power Electronics and Drive Systems 2001 Proceedings; vol. 2; pp. 725-731; 7 pages.

Kyo, et al.; "New Era for Therapeutic Strategy for Heart Failure: Destination Therapy by Left Ventricular Assist Device;" Journal of Cardiology; vol. 59; No. 2; Mar. 2012; pp. 101-109; 9 pages.

LaRose, et al.; "Design Concepts and Principle of Operation of the HeartWare Ventricular Assist System;" ASAIO Journal 2010; Jun. 2010; pp. 285-289; 5 pages.

Loforte, et al.; "Levitronix CentriMag Third-Generation Magnetically Levitated Continuous Flow Pump as Bridge to Solution;" ASAIO Journal 2011; Adult Circulatory Support; vol. 57; No. 4; Jul. 2011; pp. 247-253; 7 pages.

Loree, II, et al.; "The HeartMate III: Design and In Vivo Studies of a Maglev Centrifugal Left Ventricular Assist Device;" Artificial Organs; International Society for Artificial Organs; vol. 25; No. 5; May 2001; pp. 386-391; 6 pages.

Maslen, et al.; "Magnetic Bearing Design for Reduced Power Consumption;" Journal of Tribology; ASME; vol. 118; Oct. 1996; pp. 839-846; 8 pages.

Melcher; "Continuum Electromechanics;" Massachusetts Institute of Technology; The MIT Press; Jun. 29, 1981; Part 1 of 2; 320 pages.

Melcher; "Continuum Electromechanics;" Massachusetts Institute of Technology; The MIT Press; Jun. 29, 1981; Part 2 of 2; 307 pages.

Moazami, et al.; "Axial and Centrifugal Continuous-Flow Rotary Pumps: A Translation from Pump Mechanics to Clinical Practice;" The Journal of Heart and Lunch Transplantation; vol. 32; No. 1; pp. 1-11; Jan. 2013; pp. 1-11; 11 pages.

Morita, et al.; "Improvement of Position-Sensing Characteristics in Self-Sensing Active Magnetic Bearings;" 2005 European Conference on Power Electronics and Applications; 2005; pp. 1-8; 8 pages.

Nejad, et al.; "Hysteresis Self-Bearing Motor;" ISMB14; $14^{th}$ International Symposium on Magnetic Bearings; Aug. 11-14, 2014; pp. 737-742; 6 pages.

Nejad, "Self-Bearing Motor Design & Control;" Massachusetts Institute of Technology; Department of Mechanical Engineering; Thesis; Jan. 15, 2013; Part 1 of 3; 100 pages.

Nejad, "Self-Bearing Motor Design & Control;" Massachusetts Institute of Technology; Department of Mechanical Engineering; Thesis; Jan. 15, 2013; Part 2 of 3; 100 pages.

Nejad, "Self-Bearing Motor Design & Control;" Massachusetts Institute of Technology; Department of Mechanical Engineering; Thesis; Jan. 15, 2013; Part 3 of 3; 68 pages.

Nitao, et al.; "Equivalent Circuit Modeling of Hysteresis Motors;" Lawrence Livermore National Laboratory (LLNL-TR-416493); Jul. 21, 2009; 57 pages.

Pagani; "Continuous-Flow Rotary Left Ventricular Assist Devices with "$3^{rd}$ Generation" Design;" Thoracic and Cardiovascular Surgery; WBS; vol. 20; No. 3; 2008; pp. 255-263; 9 pages.

Patel, et al.; "A Contemporary Review of Mechanical Circulatory Support;" The Journal of Heart and Lung Transplantation; vol. 33; No. 7; Jul. 2014; pp. 667-674; 8 pages.

Radman, et al.; "Control Design of a Bearingless Flux-Switching Slice Drive;" Proceedings of the $6^{th}$ European Embedded Design in Education and Research (EDERC); 2014; pp. 197-201; 5 pages.

(56) References Cited

OTHER PUBLICATIONS

Rahman, et al.; "A Permanent Magnet Hysteresis Hybrid Synchronous Motor for Electric Vehicles;" IEEE Transactions on Industrial Electronics; vol. 44; No. 1; Feb. 1997; pp. 46-53; 8 pages.
Rahman, et al.; "Dynamic Performance Prediction of Hysteresis Motors;" Conference Record of the 1989 IEEE Industrial Applications Society Annual Meeting; 1989; vol. 1; pp. 278-284; 7 pages.
Rahman, et al.; "Steady-State Performance Analysis of Polyphase Hysteresis-Reluctance Motors;" IEEE Transactions on Industry Applications; vol. IA-21; No. 4; May/Jun. 1985; pp. 659-663; 5 pages.
Ritter; "Analysis and Design of a Two-Axis Noncontact Position Sensor;" Massachusetts Institute of Technology; Thesis; Feb. 1999; Part 1; 85 pages.
Ritter; "Analysis and Design of a Two-Axis Noncontact Position Sensor;" Massachusetts Institute of Technology; Thesis; Feb. 1999; Part 2; 81 pages.
Roters; "The Hysteresis Motor-Advances Which Permit Economical Fractional Horsepower Ratings;" Transactions of the American Institute of Electrical Engineers; vol. 66; No. 1; Jan. 1947; pp. 1419-1430; 12 pages.
Schammass, et al.; "New Results for Self-Sensing Active Magnetic Bearings Using Modulation Approach;" IEEE Transactions on Control Systems Technology; vol. 13; No. 4; Jul. 2005; pp. 509-516; 8 pages.
Schmid, et al.; "First Clinical Experience with the Incor Left Ventricular Assist Device"; Mechanical Circulatory Support; The Journal of Heart and Lung Transplantation; vol. 24; No. 9; Sep. 2005; pp. 1188-1194; 7 pages.
Silber, et al.; "Design Aspects of Bearingless Slice Motors;" IEEE/ASME Transactions on Mechatronics; vol. 10; No. 6; Dec. 2005; pp. 611-617; 7 pages.
Soucy, et al.; "Defining Pulsatility During Continuous-Flow Ventricular Assist Device Support;" The Journal of Heart and Lung Transplantation; vol. 32; No. 6; Jun. 2013; pp. 581-587; 7 pages.
Studer; "A Practical Magnetic Bearing;" IEEE Transactions on Magnetics; vol. 1; MAG-13; No. 5; Sep. 1977; pp. 1155-1157; 3 pages.
Takantani; "Progress of Rotary Blood Pumps: Presidential Address, International Society for Rotary Blood Pumps;" Artificial Organs; International Center for Artificial Organs and Transplantation; vol. 31; Issue 5; May 2007; pp. 329-344; 16 pages.
Teare; Jr., "Theory of Hysteresis-Motor Torque;" Transactions of the American Institute of Electrical Engineers; vol. 59; Issue 12; Dec. 1940; pp. 907-912; 6 pages.
Timms; "A Review of Clinical Ventricular Assist Devices;" Medical Engineering and Physics; vol. 33; No. 9; 2011; pp. 1041-1047; 7 pages.
Wampler, et al.; "A Sealless Centrifugal Blood Pump with Passive Magnetic and Hydrodynamic Bearings;" Artificial Organs; International Society for Artificial Organs; vol. 23; No. 8; 1999; pp. 780-784; 5 pages.
Wu, et al.; "A Self-Bearing Centrifugal Blood Pump Based on Induction Motor with Active and Passive Magnetic Bearings;" Fifth International Conference on Power Electronics and Drive Systems; PEDS; 2003; vol. 2; pp. 1642-1646; 5 pages.
Zhou; "Magnetically Suspended Reaction Sphere with One-Axis Hysteresis Drive;" Massachusetts Institute of Technology; Thesis; Jun. 2014; 190 pages.
Zhou, et al.; "Magnetically Suspended Reaction Sphere with One-Axis Hysteresis Drive;" Proceedings of ISMB 14; 2014; 7 pages.
PCT Written Opinion of the International Searching Authority dated Sep. 7, 2017, for Application No. PCT/US2017/038019; 4 pages.
PCT International Search Report dated Sep. 7, 2017, for Application No. PCT/US2017/038019; 2 pages.
PCT International Preliminary Report dated Feb. 15, 2018 for International Application No. PCT/US2016/045520; 12 Pages.
PCT Search Report of the ISA for PCT Appl. No. PCT/US2016/045520 dated Oct. 14, 2016; 3 pages.
PCT Written Opinion of the ISA for PCT Appl. No. PCT/US2016/045520 dated Oct. 14, 2016; 10 pages.

\* cited by examiner

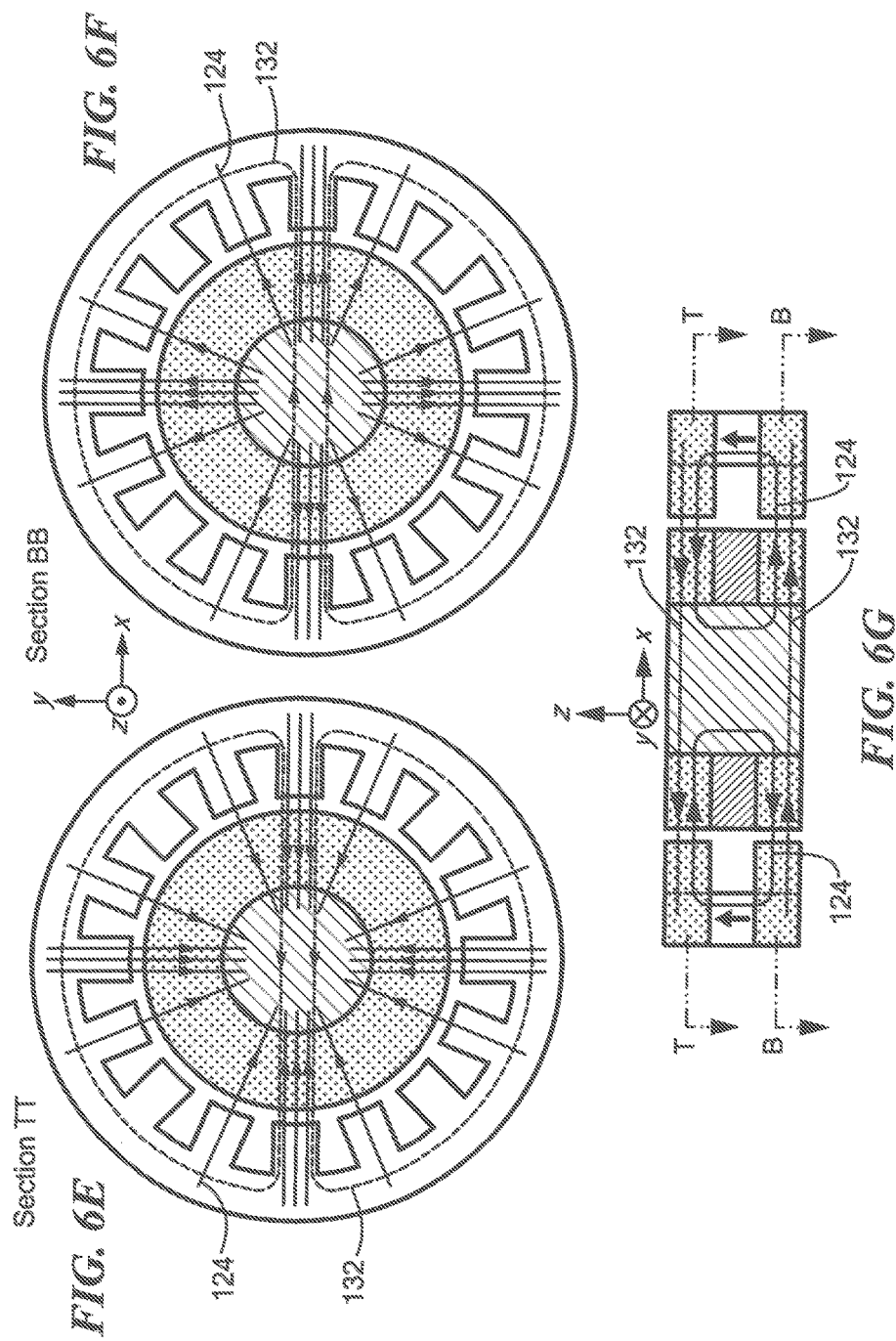

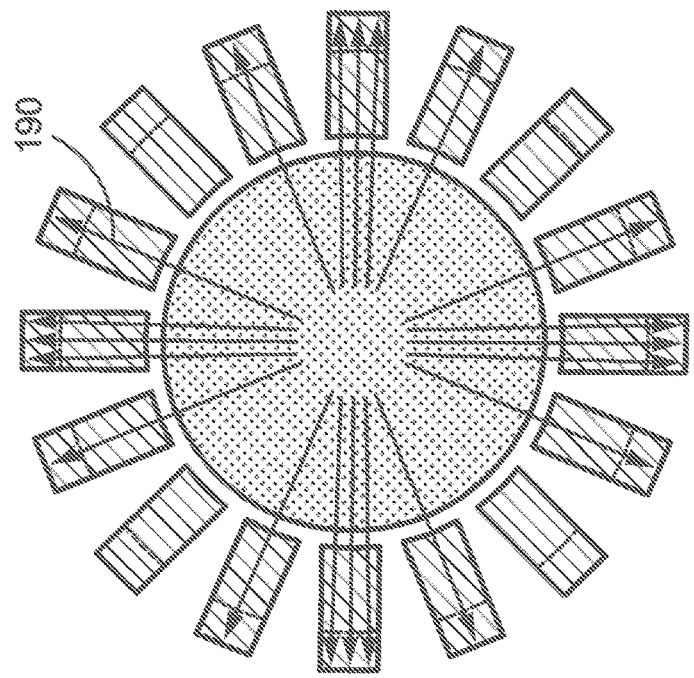
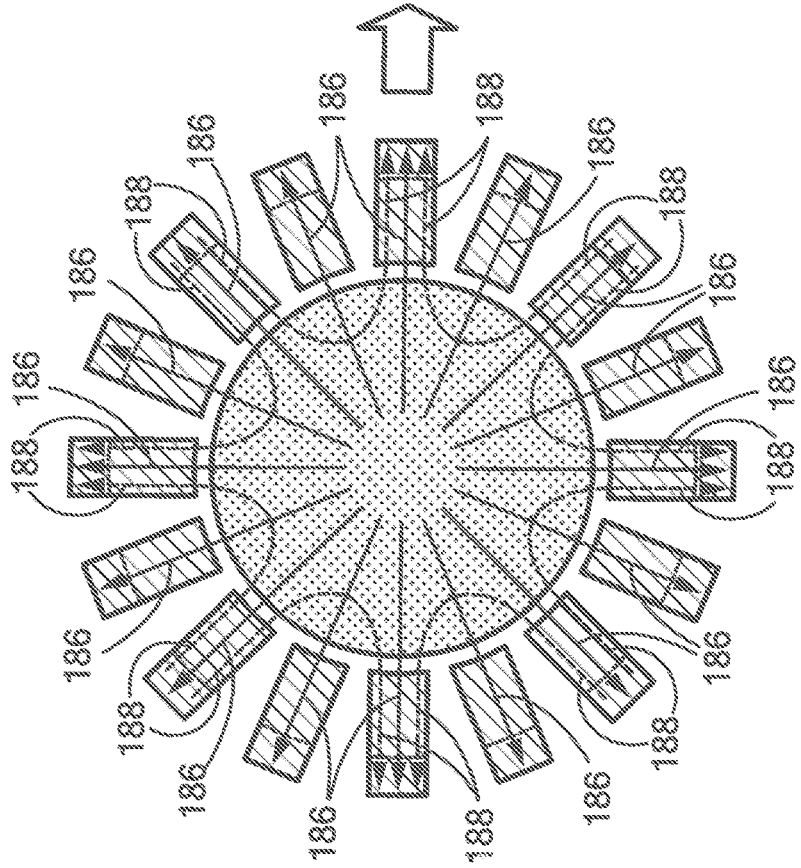
FIG. 8A
FIG. 8B

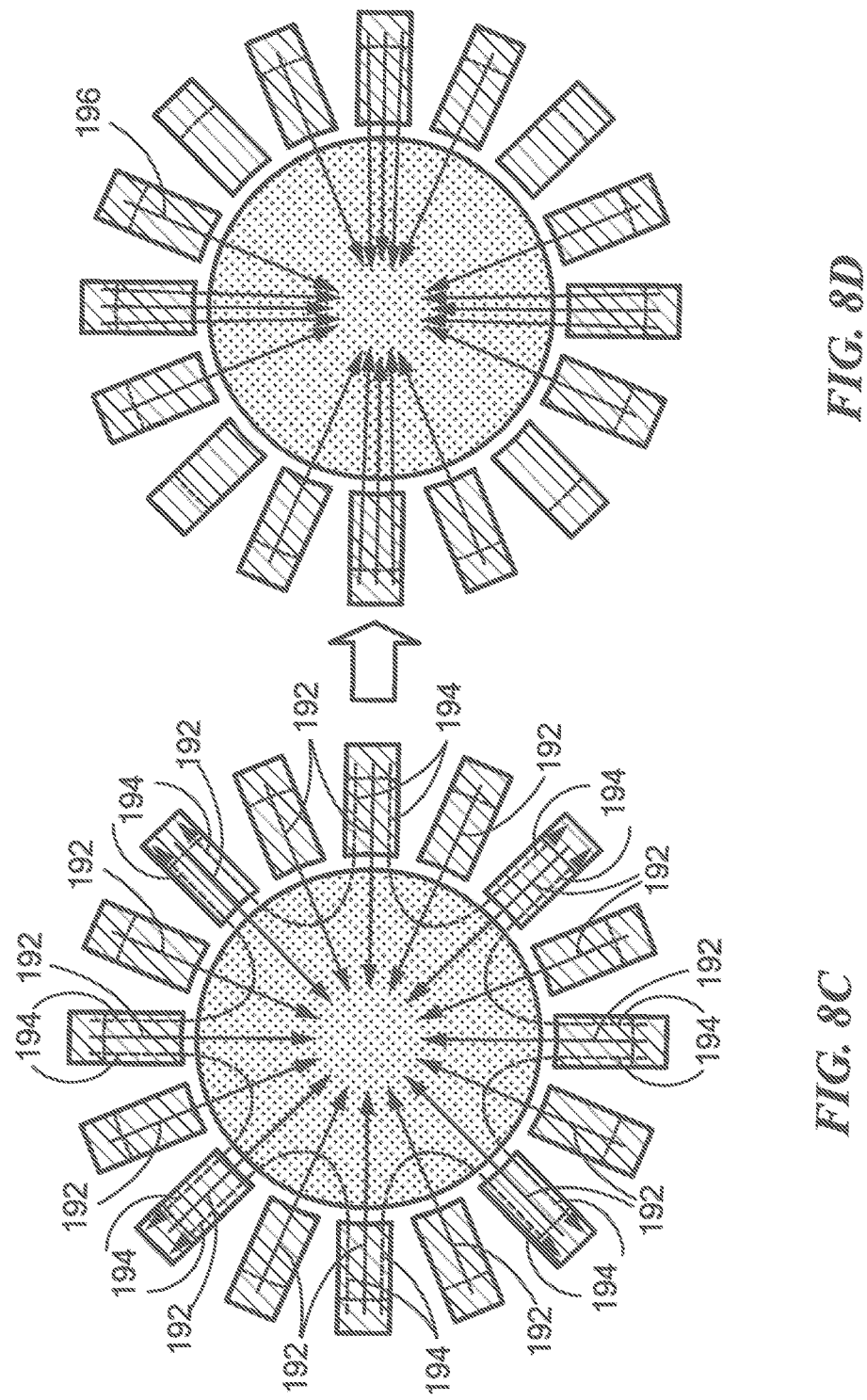

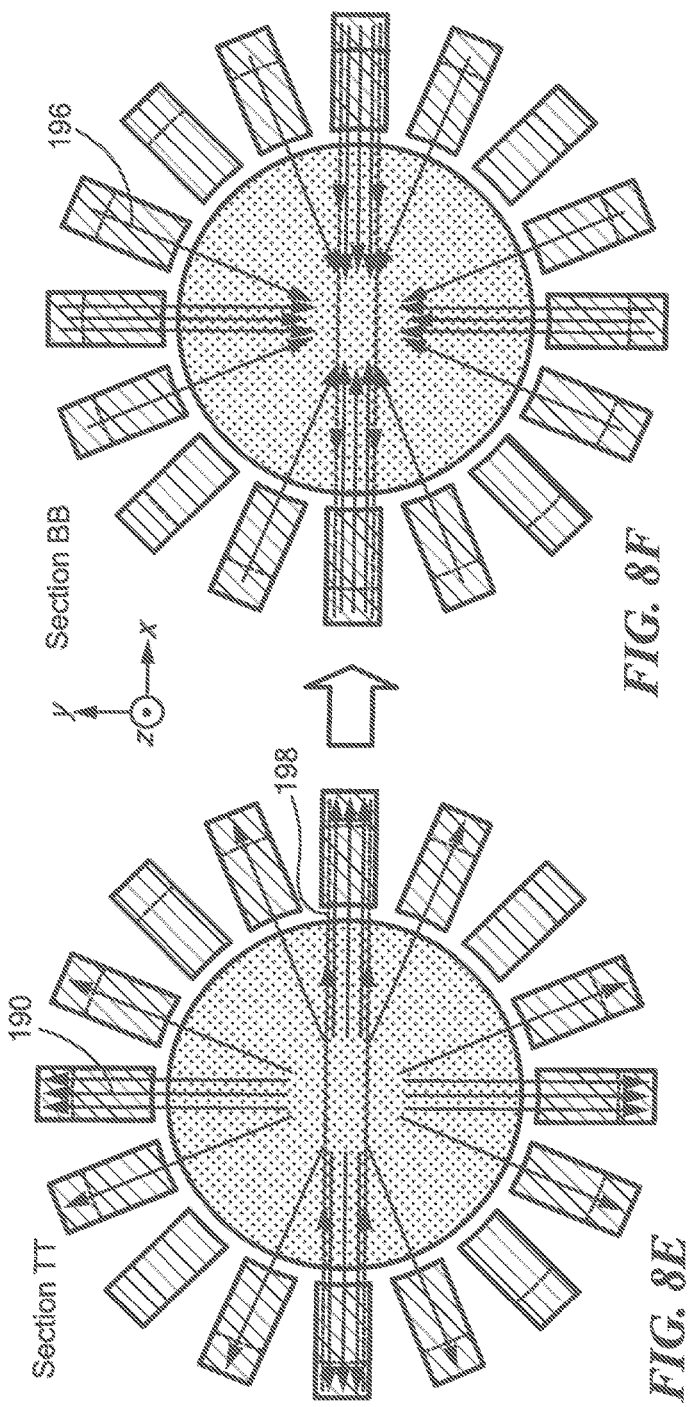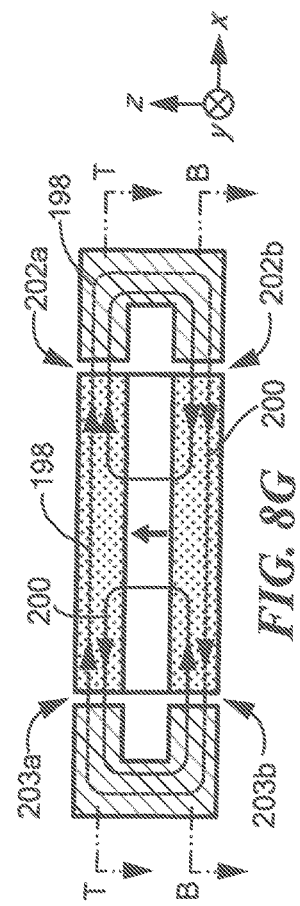

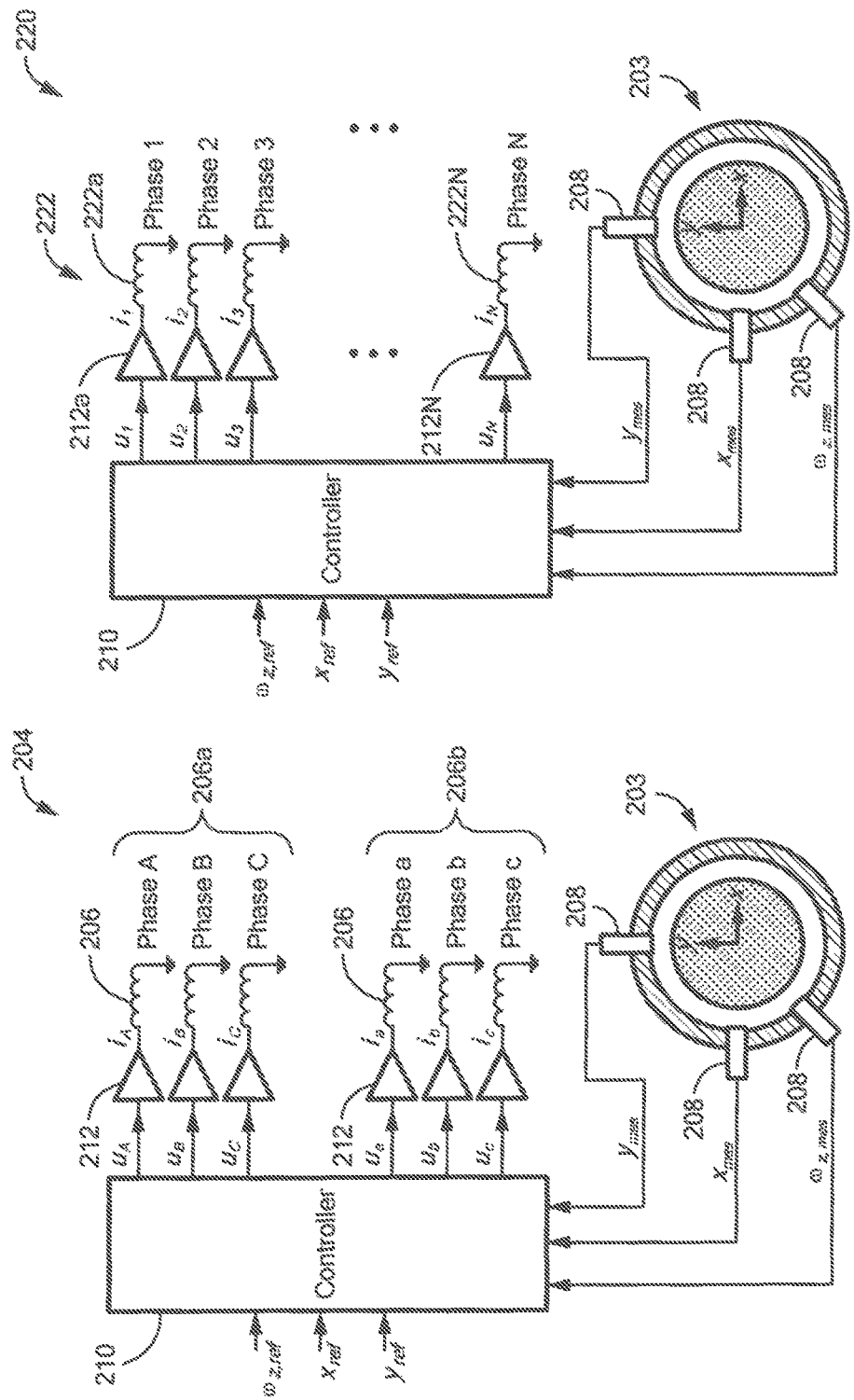

HOMOPOLAR, FLUX-BIASED HYSTERESIS BEARINGLESS MOTOR

CROSS-REFERENCE TO RELATED APPLICATIONS

This application claims the benefit under U.S.C. § 119(e) of U.S. Provisional Application No. 62/201,661 filed Aug. 6, 2015, titled "SELF-BEARING HYSTERESIS MOTOR FOR ROTARY PUMPS", which is incorporated herein by reference in its entirety.

BACKGROUND

As is known in the art, bearingless motors levitate and drive a rotor with a single stator unit. This approach can eliminate mechanical bearings in a compact form factor.

As is also known, bearingless motor technology has drawn international research efforts, which has led to developments of bearingless motors of various types. Bearingless motors are found to be particularly useful in applications such as blood pumps and pumps for high-purity chemical processes. Bearingless slice motors, developed by Barletta et al. (1996) and further studied by Silber et al. (2005), are particularly suitable for such applications. Bearingless slice motors levitate a pump impeller passively in axial and tilting directions and actively in two radial directions. The passive levitation is realized with reluctance forces generated between a soft-magnetic stator and an impeller comprising a permanent magnet. Active levitation, on the other hand, is realized with feedback control. Gruber et al. (2015) developed a bearingless slice motor that drives a reluctance rotor. In such an embodiment, the magnet is eliminated from the rotor and placed on the stator to create a homopolar bias flux for passive stabilization of the rotor in axial and tilting directions.

SUMMARY

Described herein are concepts, structures and techniques directed toward a homopolar bearingless motor having a hysteresis rotor.

Replacing a reluctance rotor in bearingless slice motors of the type described in (Gruber, et al.), with a hysteresis rotor enables the advantages from hysteresis motors, such as robust and simple rotor construction, smooth torque generation, and smooth transition from asynchronous to synchronous operation. These advantages make the homopolar flux biased, hysteresis bearingless motor described herein suitable for a wide variety of applications including, but not limited to: high-speed rotary applications, ultraclean pumping systems and/or blood pumps that require disposable impeller replacement. The operating principle of a homopolar hysteresis bearingless motor as described herein can be best understood as a combination of a flux-biased magnetic bearing and a hysteresis motor.

In accordance with a further aspect of the concepts, systems, circuits and techniques described herein, a homopolar bearingless hysteresis rotary pump includes an impeller, a housing, a stator and means for providing homopolar flux biasing. The impeller is contained in the housing and the impeller-housing combination is mounted on the stator. The stator modulates magnetic flux based upon position measurements so as to levitate the impeller inside the housing. The stator also generates revolving magnetic flux to rotate the impeller about its symmetric axis. The rotating impeller pushes a fluid through a volute structure of the housing to a pump outlet.

With this particular arrangement, an electric drive to pump a fluid by rotating a magnetically-levitated hysteresis rotor is provided. Utilizing homopolar flux biasing decouples the force and torque generations, provides force generation independent of rotor angular position, and provides force/current for suspension which are higher than prior art approaches, and suspension force linearization. Such a pump finds use in a wide variety of applications including, but not limited to, blood pumps, ultra clean pumping systems and high speed rotary applications. Since no mechanical connections (such as bearings and shafts) are involved for the impeller suspension and torque generation, pumps provided in accordance with the concepts described herein impose less stress and heat on a fluid than in prior art approaches. Therefore, pumps provided in accordance with the concepts described herein are particularly advantageous for pumping delicate fluids such as biological samples. Such pumps can thus be used as blood pumps to reduce the level of hemolysis and thrombosis.

Also, the magnetic levitation eliminates unnecessary chemicals such as lubricants, which is beneficial for chemical processes that require a high degree of purity control. Moreover, in one embodiment, the hysteresis rotor has neither permanent magnets nor salient features on it, which can reduce the manufacturing cost of a rotor-impeller assembly.

In one embodiment, a hysteresis rotor can be provided from a hard magnetic material by machining, forming or molding or by otherwise providing the material in an axi-symmetric shape. For example, a turning process may be used to provide an axi-symmetric hysteresis rotor. Low-cost rotor manufacturing shows promise because some applications, such as a blood pump applications, require the impeller modules to be disposable in order to reduce, or ideally prevent, infection across patients.

Other advantages of the concepts, systems and techniques described herein include: less vibration compared to reluctance-type and permanent magnet-type self-bearing motors. This is because the hysteresis rotor described herein can be made having a greater degree of axi-symmetricity compared with prior art rotors. In one embodiment, a high degree of axi-symmetry is achieved by manufacturing the rotor using a turning process. Furthermore, due to the relatively high material strength, the hysteresis rotor can withstand higher rotational speed compared to permanent magnet-type self-bearing motors. Further still, a PM-induced bias flux enables the stator to generate higher bearing forces for a given input current, thereby reducing the operating power for suspension.

The concepts, systems and techniques described herein may find use in a wide variety of applications, including, but not limited to: miniature pumps to deliver bio-medical samples that allow a limited amount of exposure to mechanical stress and vibration; precision pumps for chemical processes and semi-conductor industries that requires tight purity control; and turbo-molecular pumps for vacuum industries.

Furthermore, in addition to using the concepts, systems and techniques described herein for fluid pump applications, the concepts, systems and techniques described herein may also be applied to other applications as follows: high-speed motors for machining spindles, turbines, electric vehicles, and turbochargers.

BRIEF DESCRIPTION OF THE DRAWINGS

FIG. 6E is a cross-sectional view of the fluid pump of FIG. 6 taken across lines T-T of FIG. 6G which illustrates suspension force generation on the top layer of the hysteresis rotor;

FIG. 6F is a cross-sectional view of the fluid pump of FIG. 6 taken across lines B-B of FIG. 6G which illustrates suspension force generation on the bottom layer of the hysteresis rotor;

FIG. 6G is a side cross-sectional view of a portion of a fluid pump which illustrates suspension forces on the top and bottom layers of the hysteresis rotor;

FIGS. 8A, 8B are cross-sectional views of the pump of FIG. 8 taken along lines T-T which illustrate example flux patterns through the top hysteresis rotor of FIG. 8;

FIGS. 8C, 8D are cross-sectional views of the pump of FIG. 6 taken along lines B-B which illustrate example flux patterns through the bottom hysteresis rotor of FIG. 8;

FIG. 8E is a cross-sectional view of the fluid pump of FIG. 8 taken across lines T-T of FIG. 8G which illustrates suspension force generation on the top layer of the hysteresis rotor;

FIG. 8F is a cross-sectional view of the fluid pump of FIG. 8 taken across lines B-B of FIG. 8G which illustrates suspension force generation on the bottom layer of the hysteresis rotor;

FIG. 8G is a side cross-sectional view of a portion of a fluid pump which illustrates suspension forces on the top and the bottom layers of the hysteresis rotor;

FIG. 9 is a block diagram of a system utilizing a homopolar flux-biased hysteresis bearingless motor having three-phase motor windings and three-phase suspension windings; and FIG. 10 is a block diagram of a system utilizing a homopolar flux-biased hysteresis bearingless motor having independently drivable windings.

DETAILED DESCRIPTION

Before describing embodiments utilizing the broad concepts described herein, some introductory concepts are explained. It should be appreciated that reference is sometimes made herein to motors or pumps having a particular configuration such as a particular number of stators or stator windings or particular rotor or magnet configurations. Such examples and details are provided only in an effort to promote clarity in the written description and figures which illustrate the concepts sought to be protected herein. Such examples and details are not intended as, and should not be construed as, limiting the scope of protection.

Described is a bearingless motor which utilizes a homopolar flux-biased magnetic bearing for suspension force generation. The motor levitates and rotates a hysteresis rotor provided from a semi-hard magnetic material. The hysteresis rotor is biased with a homopolar permanent-magnetic flux, onto which a two-pole flux may be superimposed to generate suspension forces. Torque is generated by a hysteretic coupling between the rotor and a rotating multi-pole stator-induced motor flux which is imposed on the rotor in addition to the two-pole suspension flux and the homopolar bias flux.

Such bearingless motors may find use in a wide variety of applications including, but not limited to: miniature pumps to deliver bio-medical samples (e.g. blood) with a limited amount of exposure to mechanical stress and vibration; precision pumps for chemical processes and semi-conductor industries requiring a high degree of purity control; blowers for high temperature gas such as steam; and turbo-molecular pumps for vacuum industries. Furthermore, although the concepts described herein find use in fluid pump applications, the concepts described can also be applied to other areas including, but not limited to high-speed motors for machining spindles, turbines, electric vehicles, and turbochargers.

Figure 1:
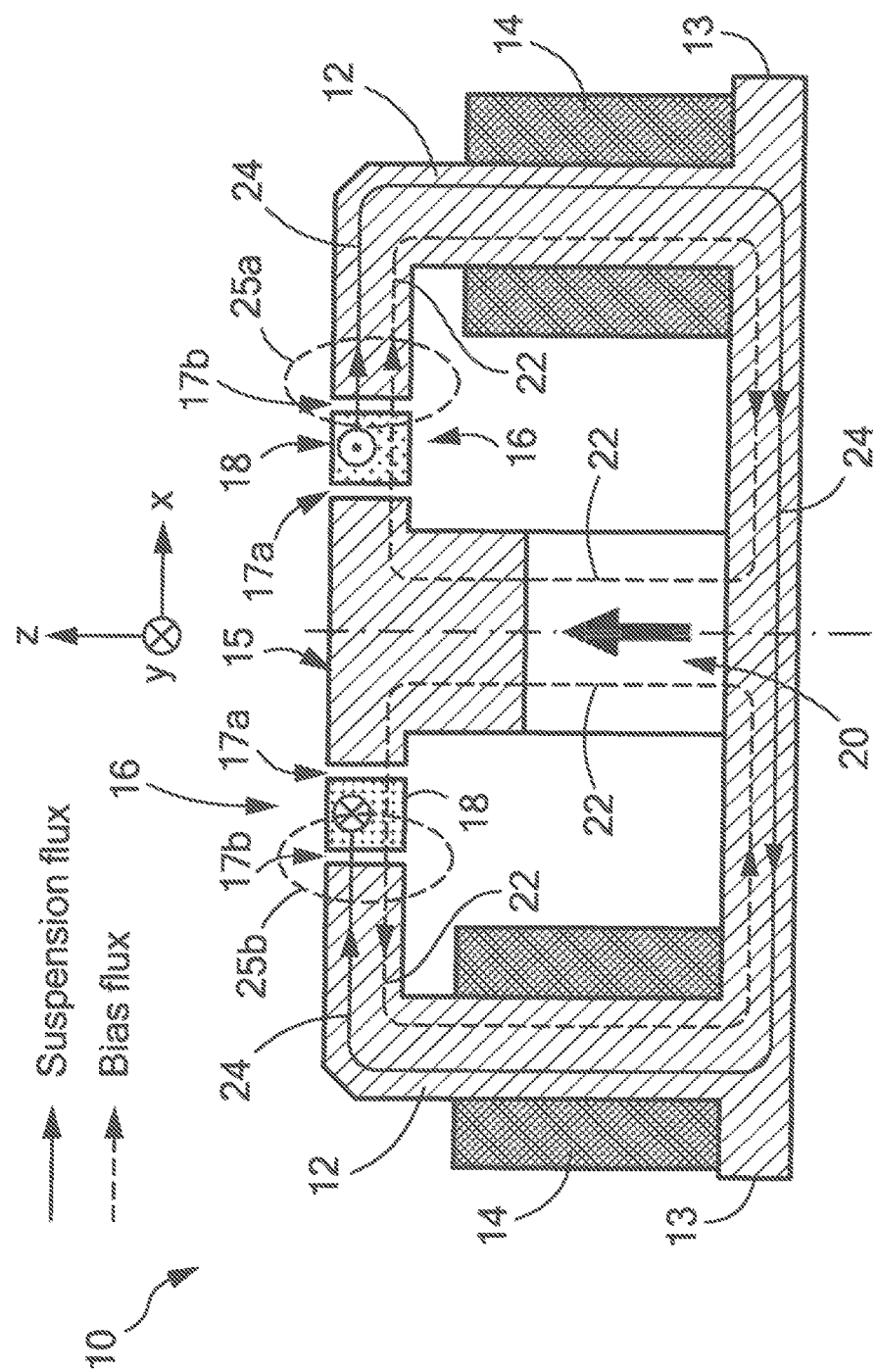
FIG. 1 is a cross-sectional side view of a homopolar flux-biased hysteresis bearingless motor having a hysteresis rotor.
Figure 1A:
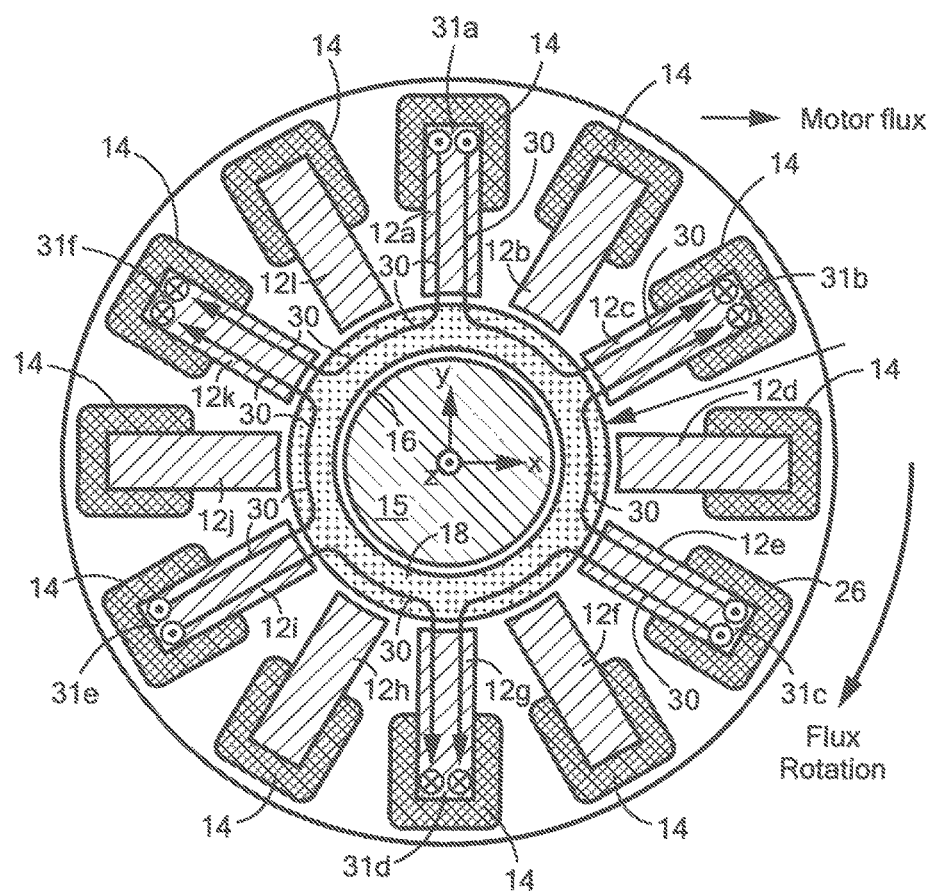
FIG. 1A is a top view of a homopolar flux-biased hysteresis bearingless motor having a hysteresis rotor which may be the same as or similar to the motor of FIG. 1.
Figure 1B:
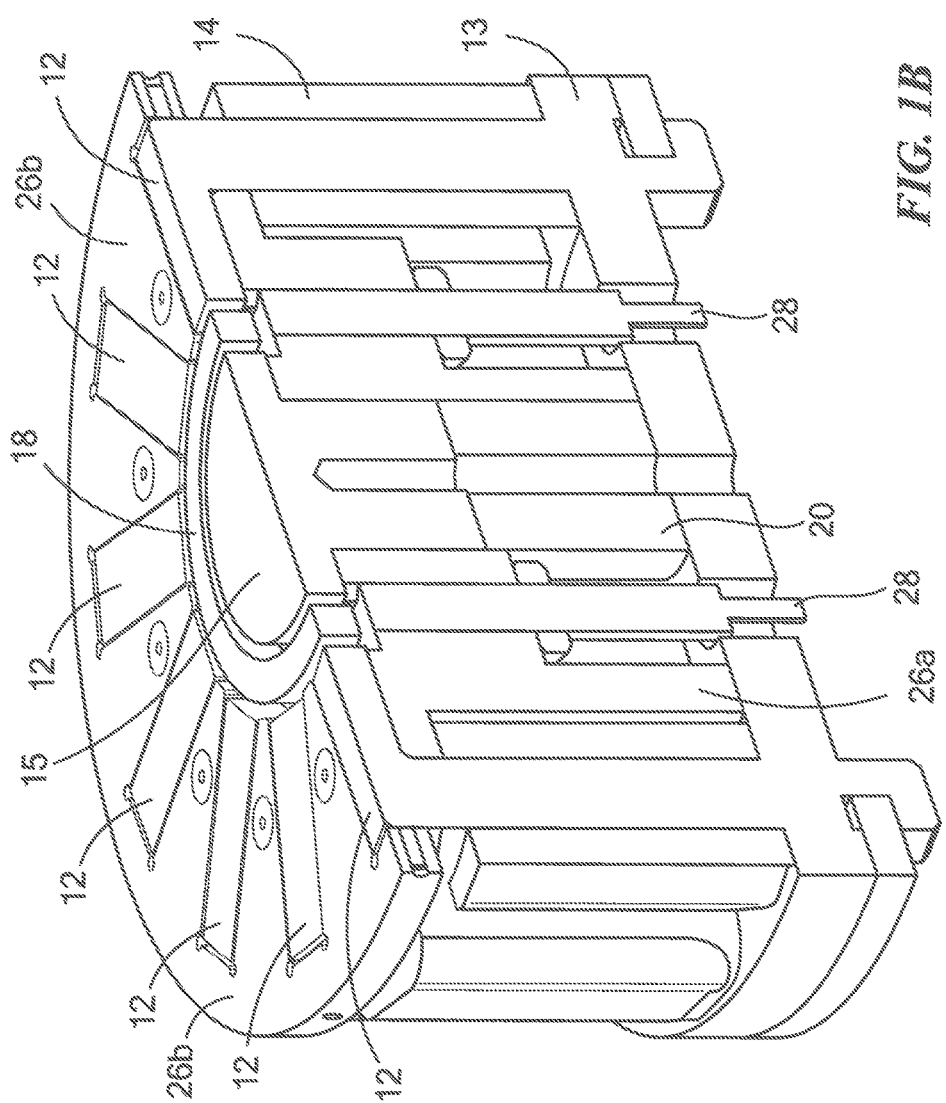
FIG. 1B is an isometric partial sectional view of a homopolar flux-biased hysteresis bearingless motor having a hysteresis rotor which may be the same or as similar to the motors of FIGS. 1 and 1A.

Referring now to FIGS. 1-1B in which like elements are provided having like reference designations, a homopolar flux-biased hysteresis bearingless motor 10 includes a stator comprising a plurality of, here twelve, teeth 12a-12l generally denoted 12. In this illustrative embodiment, teeth 12 are provided having an L-shape (FIG. 1B) projecting up from a stator base or plate 13 to form an outer perimeter. Stator windings 14 are disposed about the teeth 12. An inner central flux-biasing structure (or flux collector) 15 is disposed to form an annular space 16 in which is disposed a hysteresis rotor 18. With rotor 18 disposed in annular space 16, the rotor is spaced from surfaces of flux-biasing structure 15 and from surfaces of the stator by inner and outer air gaps 17a, 17b.

The hysteresis rotor 18 is characterized by at least the following features. The rotor can be geometrically axisymmetric. That is, the rotor is not required to have geometrically salient features interior and/or exterior to the surface, such as teeth, along the circumferential direction for torque generation. This characteristic makes it different from variable reluctance (switching reluctance) motors.

The rotor may be provided from a hard or semi-hard magnetic material, presenting a hysteretic B-H curve with a finite loop area enclosed by the curve, but without permanent magnetization. That is, the direction of the magnetization vector of the rotor is not fixed with respect to the body-fixed frame of the rotor. The magnetization vector at each material point is free to vary in magnitude and direction during the operation. This feature is different from motors using permanent-magnet rotors which should not demagnetize the permanent-magnet rotor during proper operation.

Electrical conductivity is not a necessary condition for the hysteresis rotor to be functional. In other words, a non-conductive rotor made of magnetically hard or semi-hard material can function as a hysteresis rotor. This feature makes it different from an induction motor. However, an electrically conductive rotor is acceptable, as long as the rotor material has the desired hysteresis characteristics.

A permanent magnet (PM) 20 is disposed below flux biasing structure 15 and generates a homopolar bias flux (illustrated as dashed lines identified with reference numeral 22). The magnetization of PM 20 may be oriented in any axial direction which provides a suitable bias flux 22. The homopolar bias flux 22 from permanent magnet 20 traverses through a magnetic circuit comprising the flux biasing structure 15, the inner air gap 17a, the hysteresis rotor 18, the outer air gap 17b, the stator teeth 12, and bottom plate 13 of the stator. The stator windings 14 can superpose a 2-pole suspension flux illustrated as solid lines identified with reference numeral 24 on the homopolar bias flux to generate a radial force in the x direction (with directions as defined by the Cartesian coordinate systems shown in FIGS. 1 and 1A).

Another 2-pole suspension flux can be applied for y axis suspension. The superimposed 2-pole suspension flux is added to the homopolar bias flux in the positive x direction in region 25a (i.e. a region of field strengthening), and subtracted from the homopolar bias flux in the negative x direction in region 25b (i.e. a region of field weakening), thereby generating a net reluctance force on the rotor toward the positive x direction. As the polarity of the 2-pole flux is reversed, the direction of the reluctance force is also reversed to the negative x direction. As will be described in detail below in conjunction with FIG. 2, the magnitude and the polarity of the 2-pole flux can be actively controlled based upon rotor position measurements for stable suspension. Due to the homopolar bias flux, other degrees of freedom, displacement along z axis and tilts about x and y axes, are passively stable, due to the positive magnetic stiffnesses in these degrees of freedom.

Referring now to FIG. 1A, an illustration of the action of a hysteresis motor provided in accordance with the concepts described herein shows that as the stator windings 14 generate a rotating 6-pole motor flux (as illustrated by the solid lines labeled with reference numeral 30 in FIG. 1A), the rotor becomes magnetized with a 6-pole pattern 31a-31f. Because of the hysteresis, the induced magnetization tends to be persistent on the rotor 18 and lag behind the stator excitation by some angle. The interaction between the excitation magnetic fields and the induced magnetization generates a torque τ which, as the radial thickness of the rings is decreased, may be computed as:

$$\tau = \frac{VP_{torque}}{4\pi} \oint B_\theta dH_\theta \qquad \text{Eq. 1}$$

where
V is the material volume;
$P_{torque}$ is the number of poles of the motor flux;
$H_\theta$ is the tangential component of the magnetic field intensity; and
$B_\theta$ is the tangential component of the magnetic flux density; and
the integral is evaluated along a circumference of the rotor.

It should be appreciated that Eq. 1 is for a limit case when a cylindrical rotor's radial thickness $(r_{out}-r_{in})$ decreases much smaller than the mean radius $[(r_{out}+r_{in})/2]$. A more general formula for use with rotors having a finite radial thickness may be used.

The 6-pole motor flux ($P_{torque}=6$) does not generate radial forces by interacting with either of the homopolar bias flux ($P_{bias}=0$) or the 2-pole suspension flux ($P_{force}=2$). This is because the 6-pole motor flux does not satisfy the necessary condition to generate radial forces, $P_2=P_1\pm2$, with the other sets of flux. In general, to generate suspension forces for a given flux distribution of $P_1$ number of poles, one should superimpose an additional flux pattern of $P_2$ number of poles such that $P_2=P_1\pm2$. Specifically in the illustrative embodiment of FIGS. 1 and 1A, $P_{torque} \neq P_{force} \pm 2$, $P_{torque} \neq P_{bias} \pm 2$, and $P_{force}=P_{bias}+2$. Therefore, the superposition of the homopolar bias flux ($P_{bias}=0$) and the suspension flux ($P_{force}=2$) is the mechanism for force generation.

Also, the homopolar bias flux and the 2-pole suspension flux does not generate a significant drag torque. This is because when the rotor is stabilized at the center, the variation of the bias flux and suspension flux along the circumference becomes negligible, thereby generating a negligible eddy-current drag as well as the hysteresis drag. Thus, the mechanisms for torque generation and suspension force generation are decoupled at the hardware level.

Referring now to FIG. 1B, in which like elements of FIGS. 1 and 1A are provided having like reference designations, an illustrative homopolar flux-biased hysteresis bearingless motor includes a hysteresis ring 18 having an outer diameter of 55-mm, an inner diameter of 45-mm (i.e. a ring width of 5 mm), and a thickness of 5-mm. In this illustrative embodiment, the hysteresis ring 18 is provided from D2 steel. It should, of course, be appreciated that other dimensions and other semi-hard magnetic materials such as Alnico may also be used.

The particular values to use for characteristics such as rotor axial stiffness, open-loop radial stiffness, tinting stiffness may be determined to suit the needs of a specific application.

Figure 4:
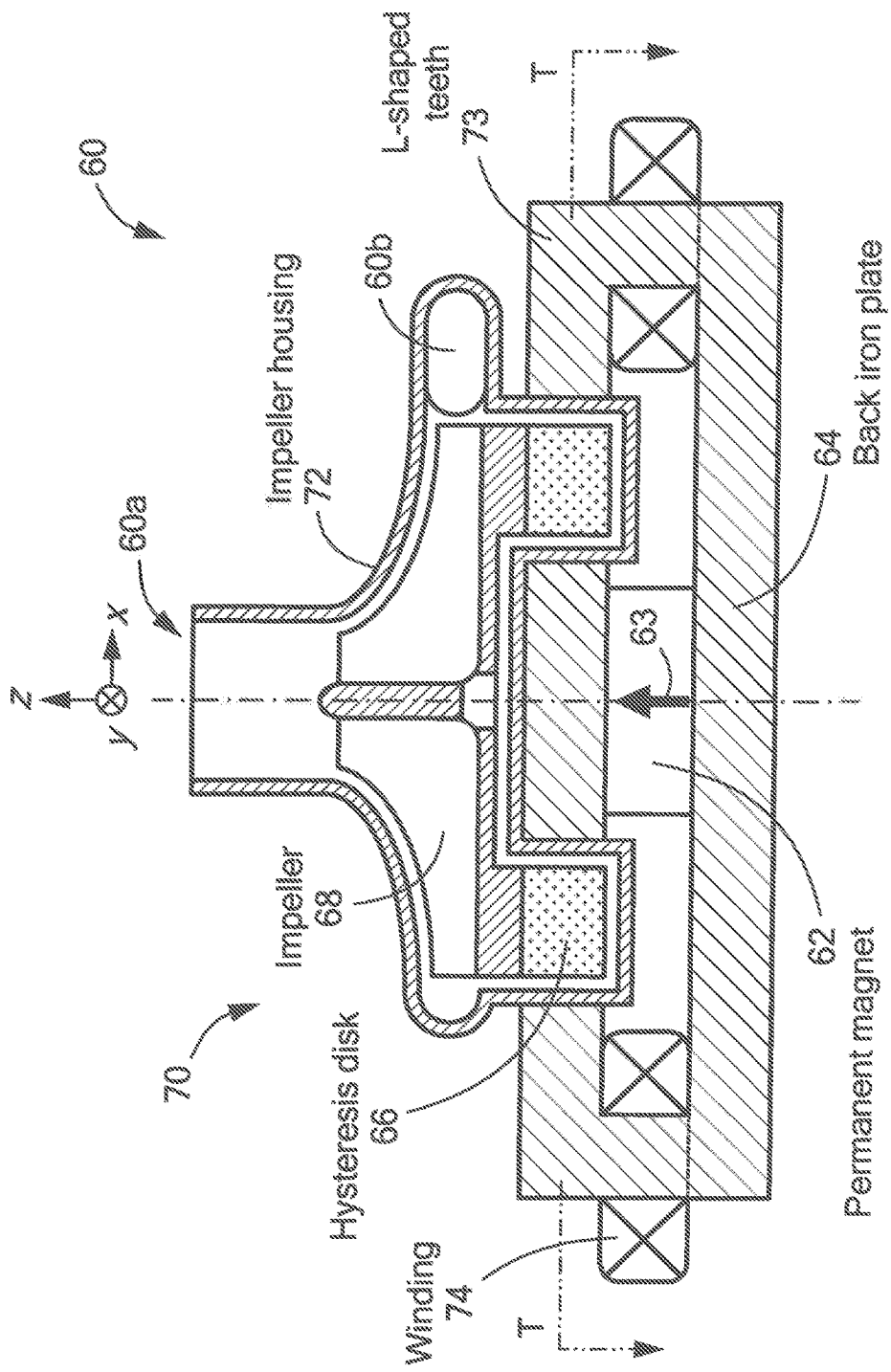
FIG. 4 is a cross-sectional view of a fluid pump having a stator and a single hysteresis ring flux-biased by a centrally located permanent magnet.
Figure 5:
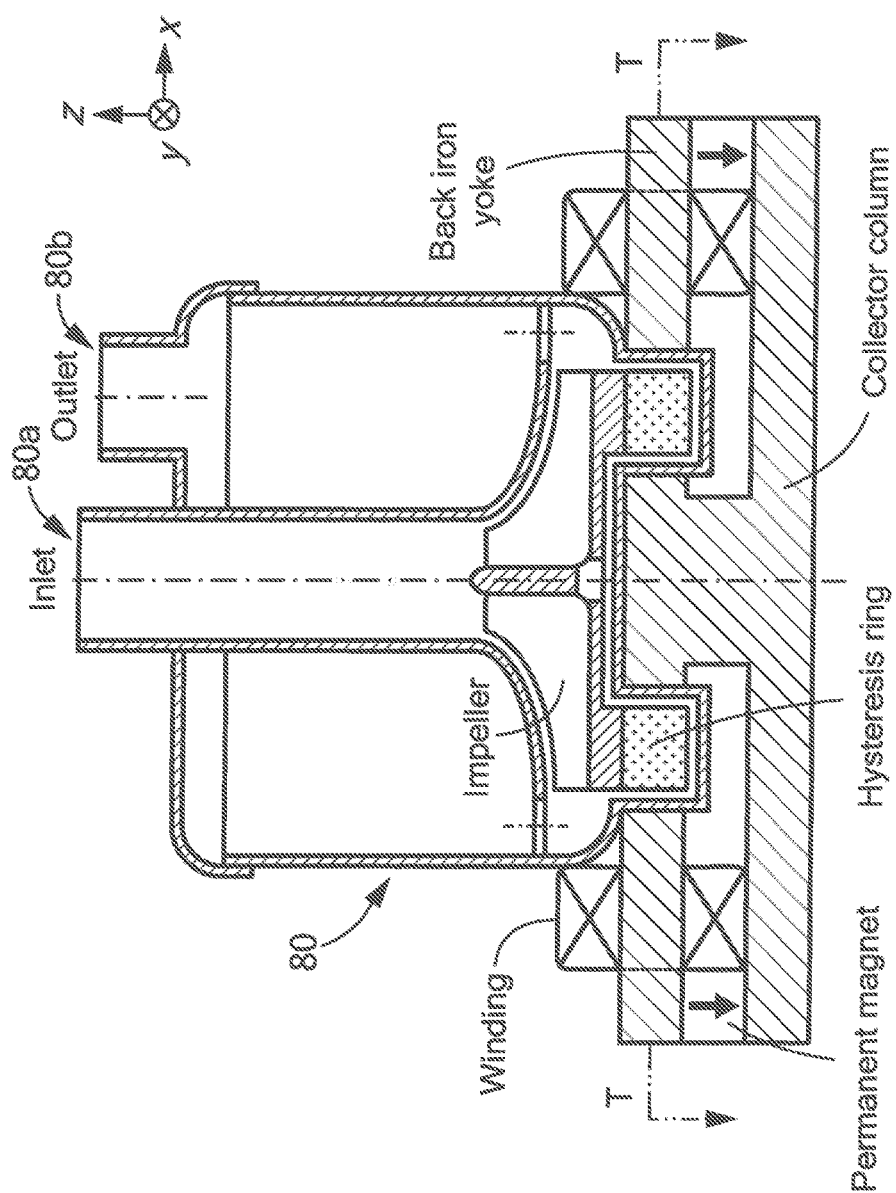
FIG. 5 is a cross-sectional view of a fluid pump having a stator and a single hysteresis ring flux-biased by one or more peripherally located permanent magnets.

As for selection of ratios between some geometric parameters, it should be appreciated that for the motor to operate as a slice motor, such as the embodiments in FIGS. 1, 4, and 5 whose displacement along z axis and tilts about x and y axes are passively stable, the rotor axial thickness/diameter ratio should be small (hence the name "slice motor").

For a given rotor axial thickness, a larger rotor width leads to larger torque generation, but the incremental gain gradually reduces above a certain rotor axial thickness.

For a given rotor radial width, a larger rotor axial thickness leads to larger torque generation. In this case, the torque increases proportionally to the axial thickness.

The illustrative homopolar flux-biased hysteresis bearingless motor further includes means for providing a homopolar bias flux. In this illustrative embodiment such means is provided as a permanent magnet 20 which provides the homopolar bias flux. In this illustrative embodiment, the permanent magnet 20 is provided as a rare earth permanent magnet (e.g. NdFeB or SmCo) having an outer diameter of about 25.4-mm, an inner diameter of about 12.7-mm, and a height of about 25.4-mm. Other sizes and types of permanent magnets may, of course, also be used.

The magnet may be selected such that the magnetic flux density in the outer air-gap is about B=0.3 T. This level of bias flux density provides an acceptable axial and tilting stiffness for passive levitation. This value can vary depending upon the design specifications and needs of a particular application.

The stator teeth 12 and bottom plate 13 may be provided from laminated steel sheets having a thickness of about 0.5 mm and in this illustrative embodiment are secured via inner and outer retainer rings 26a, 26b. Position sensors 28 are disposed proximate hysteresis ring 18. In one embodiment, the stator teeth and bottom plate may be provided via wire-electrical discharge machining technique (wire-EDM). Other techniques may, of course, also be used. Each stator tooth has a concentrated winding 14 having a wire thickness of about 0.5-mm and 800-turns. Example design parameters of an illustrative prototype system are summarized in Table 1.

TABLE 1

| | Parameter | Value |
|---|---|---|
| $D_o$ | Rotor outer diameter | 55 mm |
| $D_i$ | Rotor inner diameter | 45 mm |
| $g_o$ | Air gaps (in/out) | 2 mm |
| $B_{bias}$ | Bias flux density | 0.3 T |

Figure 2:
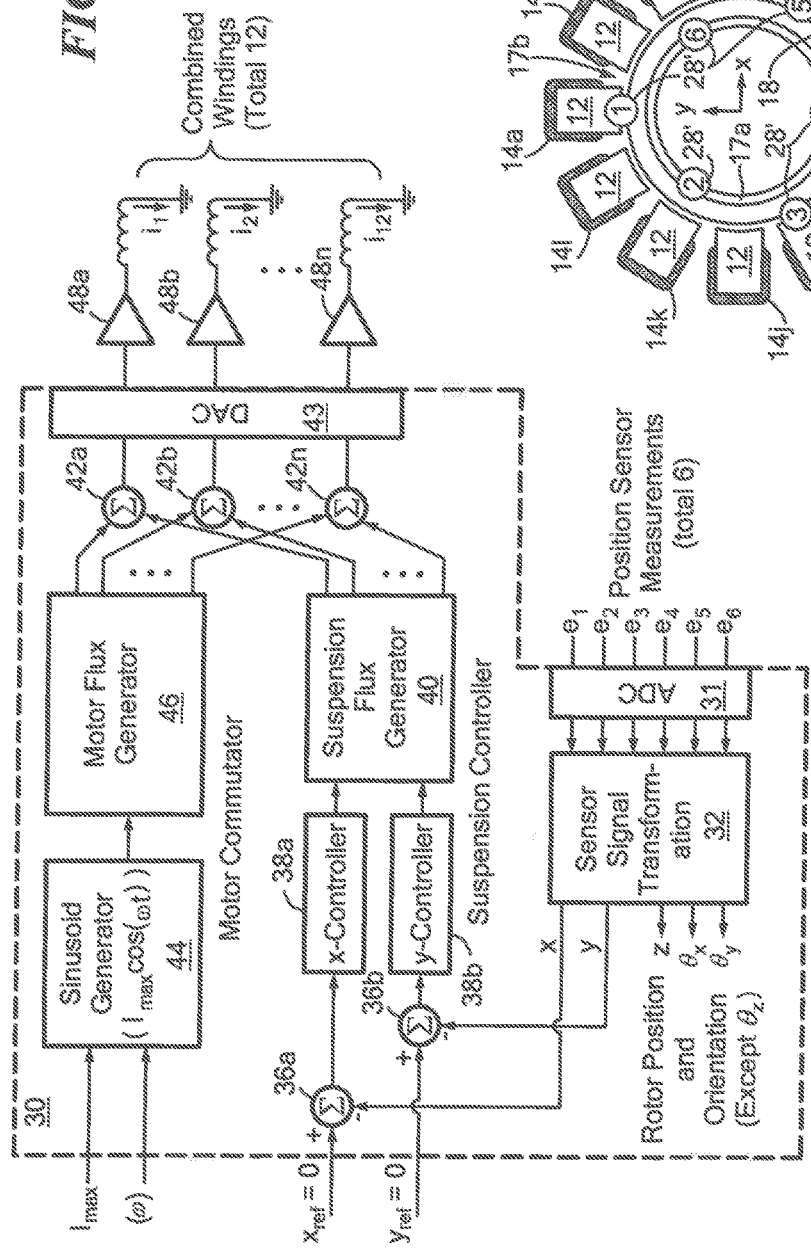
FIG. 2 is a block diagram of a control system.
Figure 2A:
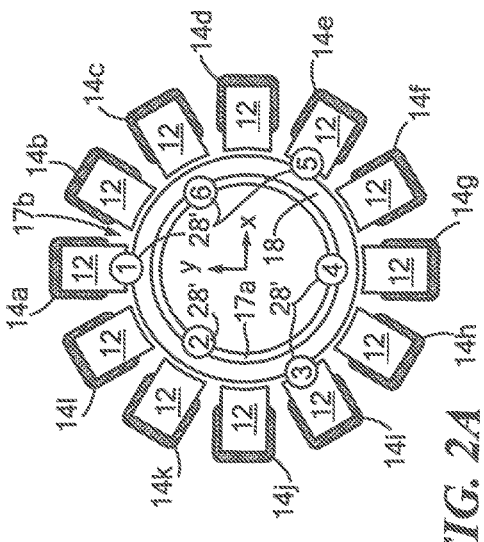
FIG. 2A is a top view of a homopolar flux-biased hysteresis bearingless motor having a hysteresis rotor which may be the same or as similar to the motors of FIGS. 1 and 1A having sensors disposed thereon.

Referring now to FIGS. 2 and 2A, a control system 30 (or more simply controller 30) suitable for use with a homopolar flux-biased hysteresis bearingless motor which may be the same as or similar to the types described above in conjunction with FIGS. 1-1B includes an analog to digital converter (ADC) 31 configured to receive analog signals e1-en from a plurality of position sensors generally denoted 28' (FIG. 2A). ADC 31 converts the signals provided thereto to a stream of digital bits (i.e. a digital signal) and provides the digital signal to a sensor signal transformation module 32. It should be appreciated that in applications in which position sensors 28' provide digital signals rather than analog signals, ADC 31 may be omitted from controller 30.

Referring briefly to FIG. 2A, in one illustrative embodiment having twelve (12) stator teeth 12', six (6) position sensors 28' may be disposed to collect rotor position information. Position sensors 28' may be the same as or similar to position sensors 28 described in conjunction with FIG. 1B. In this illustrative embodiment, position sensors 28' are provided as eddy current sensors (LDC 1000 from Texas Instruments) which are used to estimate the radial displacements of the rotor. The radial displacement values are fed back to the suspension controllers 38a, 38b for active levitation. It should, of course, be appreciated that any type of position sensor may be used. It should also be appreciated that the position sensors 28' may be disposed at any locations which allow tracking of rotor position. The minimum number of sensors to be used in practical applications is two, one measuring x and the other measuring y position of the rotor.

Typically four sensors may be used. In such embodiments, a first pair of sensors is disposed along a first axis (e.g. the x axis) and a second pair of sensors is disposed along a second, orthogonal axis (e.g. the y axis) to differentially measure the x and y displacements. This provides measurement values which are more robust than measurement values obtained using a fewer number of sensors (e.g. two sensors). Other positions may also be used. Two sensors may also be used in order to reduce costs.

An important factor to consider in sensor placement is that the sensor output should be substantially sensitive only to the radial displacements, and should be substantially insensitive to other degrees of freedom. For this reason, the position sensors are typically placed along the circumference of the rotor radially looking into the rotor through an air-gap (e.g. outer air gap 17b in FIG. 1) although other position sensor locations may also be used.

In alternate embodiments for example, (e.g. as shown in FIG. 2A) the sensors may be disposed below the rotor (e.g. looking up into the rotor). One benefit of such a configuration is that otherwise un-utilized space under the rotor may be utilized for sensor placement thereby saving space around the rotor for stator teeth.

An important sensor characteristic for sensors used in fluid applications, is that the sensor output should be substantially insensitive to process fluid filling the air gap and to any housing material. For this reason, position sensors based upon magnetic fields, such as eddy-current and variable reluctance (or inductive) sensors, are preferred for blood pump applications because the magnetic permeability of the blood is almost the same as air (and thus a fluid such as blood is transparent to such sensors), and housing materials can be chosen to have low magnetic permeability.

Referring again to FIG. 2, in response to the signals e1-en provided thereto, the sensor signal transformation module 32 generates x and y values representative of a radial position of rotor 18. Signal transformation module 32 also generates rotor position and orientation values z, $\theta_x$ and $\theta_y$ values.

It should be appreciated that the illustrative embodiments of FIGS. 1, 4, and 5 do not utilize z, θx, and θy sensor information, since these degrees of freedom are not under active control in those illustrative embodiments (they are passively stable). The embodiment in FIG. 6I, however, utilizes θx and θy to actively control the tilting, and other embodiments could use z to actively control axial displacement.

Furthermore, while axial translation (z) information is available, it is not needed, since this degree of freedom is passively stable for the illustrative embodiments described herein. The z measurement can be used, however, to estimate the level of suction pressure which pulls out the impeller/rotor along the axial direction during an operation.

The axial translation (z) multiplied by the passive axial stiffness divided by the impeller area may provide an estimate of the suction pressure.

The x and y position values are provided to respective ones of summing junction 36a, 36b. The X, Y position values are combined with (here subtracted from) respective ones of X and Y reference values $x_{ref}$, $y_{ref}$ with the summing junction outputs being coupled to inputs of respective ones of x and y suspension controllers 38a, 38b. Suspension controllers 38a, 38b receive the signals provided thereto and process the signals to generate control signals at outputs thereof.

It should be appreciated that FIG. 2 represents a control technique which can be implemented (e.g. via hardware, software or firmware) in any type of real-time controller (e.g. a computer or other processor or piece of hardware specialized for real-time computation). For example, the technique may be implemented using a Compact RIO real-time controller from National Instruments.

Such a real-time controller may include an analog to digital converter (ADC) through which sensor signals (e.g. signal e1-en in FIG. 2) are converted to digital forms. The digital signals may be processed in the real-time controller through a programmed control algorithm (software) to generate control signals. These control signals are provided through a digital to analog converter (DAC) to current control amplifiers 48a-48n.

The outputs of suspension controllers 38a, 38b are provided to a suspension flux generator 40 which distributes appropriate control signals to first inputs of respective ones of a plurality of summing junctions 42a-42n.

It should be appreciated that FIG. 2 as well as FIG. 10 illustrate a control scheme for a bearingless motor in which a single concentrated winding is inserted on each stator tooth. This type of winding is often referred to as "combined winding", since 2-pole suspension flux and 6-pole motor flux are generated in the same winding. So, the suspension winding and motor winding are combined. This is different from the winding scheme in FIG. 9 in which the motor has two sets of windings for generating motor flux and suspension flux separately.

A second input of each summing junction 42a-42n receive respective signals from outputs of a motor flux generator 46. For the combined winding case in FIG. 2, the superposition of motor flux and suspension flux happens inside summing junctions (42a-42n). In practical systems, such summing may be accomplished via a software implemented control algorithm in the controller. For the separate winding case in FIG. 9, the flux superposition happens physically on the stator.

It should be understood that the number of output signals N provided by suspension flux generator 40 corresponds to the number of independent stator windings used in the motor. In this illustrative embodiment, twelve (12) stator windings are used and thus suspension flux generator 40 provides twelve (12) control signals to first inputs of twelve (12) summing junctions 42. In preferred embodiments, the summing junctions may be implemented in software executing on a real-time controller (e.g. a processor). The output of the summing junction is converted to physical voltage waveforms through a digital to analog converter (DAC) 43. Such voltage waveforms (analog signals) become reference signals for the current control amplifiers 48a-48n.

A sinusoid generator 44 receives current and rotor rotational speed reference signals/$I_{max}$ and ω, respectively at inputs thereof. These are the values that may be input to the controller 30 and generates a sinusoidal signal having the form $I_{max} \cos(\omega t)$ at an output thereof. The output of sinusoid generator 44 is coupled to an input of a motor flux generator 46. In response to the sinusoidal signal provided thereto, motor flux generator generates phase-shifted copies of the input sinusoid: $I_{max} \cos(\omega t - 2\pi k/n)$, where t is time, n is the number of stator teeth and k=1, 2, . . . , n, which are provided to the summing junctions 42.

It should be understood that the number n of output signals provided by motor flux generator 46 corresponds to the number of stator windings used in the motor. In this illustrative embodiment, twelve (12) stator windings are used and thus motor flux generator 46 provides twelve (12) control signals to second inputs of twelve (12) summing circuits 42.

The summing junctions 42a-42n receive the signals provided thereto, combines the signals and provides input signals to respective inputs of a bank (or a plurality) of amplifiers 48a-48n, generally denoted 48.

The summing two signals is for superposition of a 6-pole motor flux and a 2-pole suspension flux. As explained above, FIG. 2 (as well as FIG. 10) shows a control scheme for a bearingless motor in which a single concentrated winding is inserted on each stator tooth. This type of winding is often referred to as "combined winding", since 2-pole suspension flux and 6-pole motor flux are generated by the same winding. So, suspension winding and motor winding are combined. This is different from the winding scheme in FIG. 9 in which the motor has two sets of windings for generating motor flux and suspension flux separately.

For the combined winding case in FIG. 2, the superposition of motor flux and suspension flux commands happens inside the control algorithm at summing junctions (42a-42n). For the separate winding case in FIG. 9, the flux command superposition happens physically on the stator.

The processing which occurs in FIG. 2 may be explained as below where, for ease of description, the summing junction 42a to 42n, will be re-named as 42(0) and 42(n−1) for simple indexing. The winding may be enumerated as k=0 is on the positive x direction, and the winding numeration increases counterclockwise up to k=n−1.

Now, let u(0) be the output of the summing junction 42(0), which becomes the input to the current control amplifier 48(0). Here, the summing junction 42(0) computes u(0)=$u_m$(0)+$u_s$(0), where $u_m$(0) is the first output from the motor flux generator 46 and $u_s$(0) is the first output from suspension flux generator 40. The subscript m and s stands for 'motor' and 'suspension' respectively. The same computation happens on the other summing junctions such that u(k)=$u_m$(k)+$u_s$(k), k=0, 1, 2, . . . , n−1, n is the number of stator windings.

The motor flux generator 46 generates the outputs:

$u_m(k) = I_{max} \cos(\omega t + 6\pi k/n)$, k=0, 1, 2, . . . , n−1 (this generates a 6-pole flux); and the suspension flux generator 40 generates the outputs:

$u_s(k) = u_x \cos(2\pi k/n) + u_y \sin(2\pi k/n)$, (this generates a 2-pole flux);

where:

$u_x$ is the x-control effort (output) from x-controller 38a; and $u_y$ is the y-control effort (output) from y-controller 38b.

In the illustrative embodiment of FIG. 2, twelve (12) current-controlled linear power amplifiers 48 drive twelve (12) windings 26a'-26l' individually. Also in the illustrative embodiment of FIG. 2, the amplifiers 48a-48l may be tuned for a bandwidth of 5 kHz, and a DC gain of 200 mA/V. The flux superposition occurs inside the controller by superposing current commands to the bank of power amplifiers 48. The controller may, for example, be provided as a cRIO-9076 target from National Instruments. It should be appreciated that any controller having suitable electrical characteristics may, of course, also be used.

Figure 3:
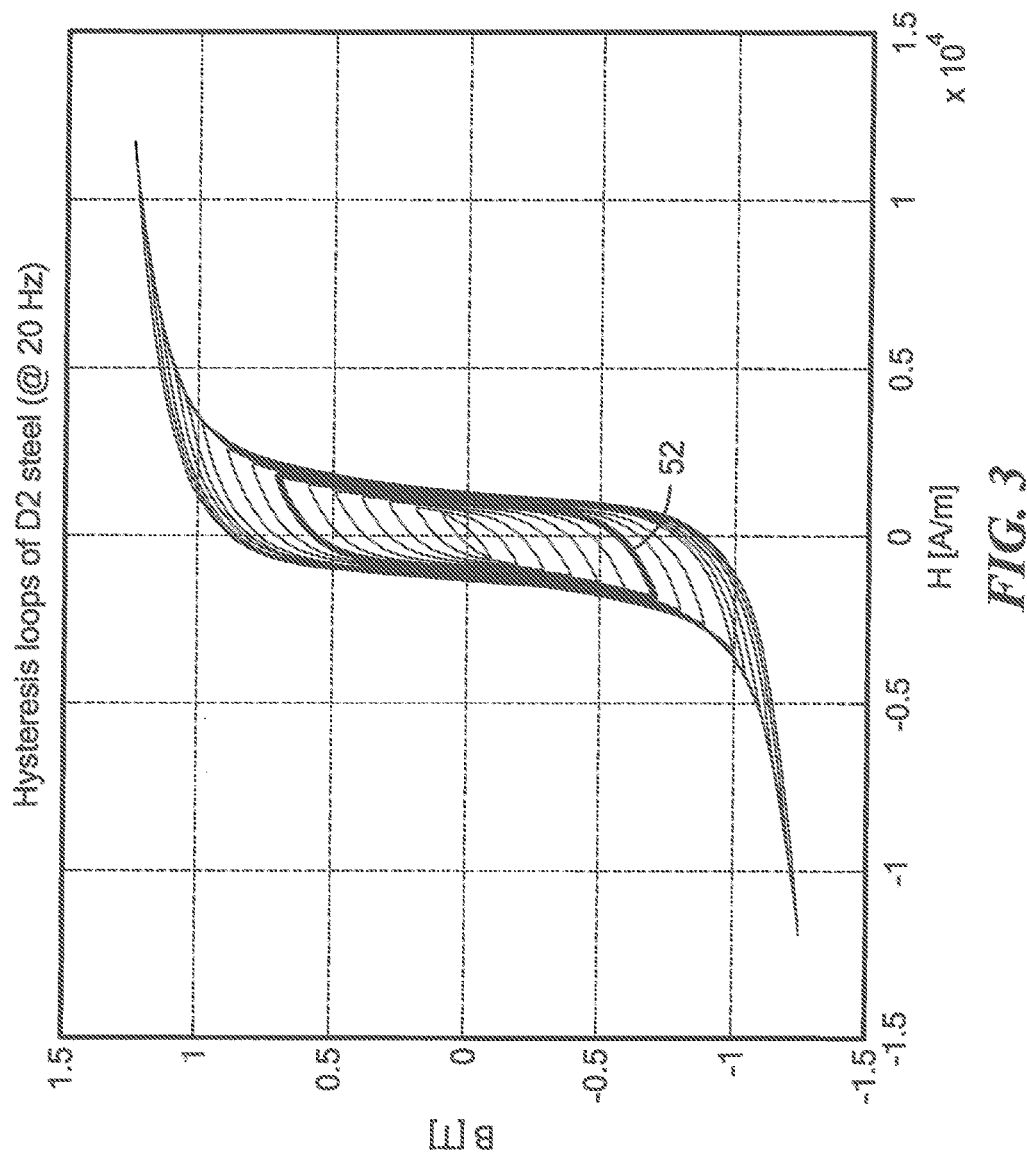
FIG. 3 is a plot of magnetic flux density (B) vs. magnetic field intensity (H) which illustrates hysteresis loops of D2 steel which is the same as or similar to the material of hysteresis rotors described in conjunction with FIGS. 1-2.

Referring now to FIG. 3, experimentally measured B-H loop data is shown. Curve 52 corresponds to a response characteristic for the case where the tangential flux density in the hysteresis rotor is sinusoidal with a peak amplitude of 0.7 T. The loop area of this case is approximately 1200 A/m·T, which leads to a hysteresis torque estimate of $\tau_z$=2.25 mNm. A hysteresis torque estimate for this simulation case can be computed from Eq. (1) as the integral is evaluated using the experimentally measured B-H loop data of FIG. 3. The plot of B vs. H illustrates hysteresis loops of D2 steel which may be the same as or similar to the rotor material described in conjunction with FIGS. 1-2. The hysteresis loops of D2 steel were measured at 20 Hz following the IEC 60404-5 international standard. It should be appreciated that increasing the intensity of 6-pole flux (increasing $I_{max}$ in the equation $u_m(k)=I_{max} \cos(\omega t+6\pi k/n)$, results in an increase in the size of the hysteresis loops (up until the point of the material saturation), thereby generating a larger torque.

Referring now to FIG. 4, a fluid pump 60 having an inlet 60a and an outlet 60b includes a permanent magnet 62 disposed on a back iron plate 64 to provide a permanent magnet (PM) biased stator and a single hysteresis rotator provided from a disk having a ring shape. In this illustration embodiment, the fluid enters pump 60 via inlet 60a at the center of the impeller, is pressurized by the centrifugal acceleration as the impeller rotates, and then exits the pump through outlet 60b.

The ring-shaped hysteresis rotor 66 is embedded on the bottom of an impeller 68 to form a rotor-impeller assembly 70. The rotor-impeller assembly is disposed in an impeller housing 72. The impeller housing 72 is mounted on the stator. The stator comprises multiple L-shaped teeth 73 coupled via back iron plate 64. Windings 74 are disposed around the L-shaped stator teeth. The back iron plate provides a common return path for the magnetic flux.

PM 62 may be provided as an axially-magnetized permanent magnet 62. In this illustrative embodiment PM 62 is provided having a direction of the magnetization indicated by arrow 63. It should be appreciated that an opposite magnetization direction may also be used.

Disposed over magnet 62 is a disk-shaped flux collector plate 75 (flux-biasing structure). The collector plate 75 and the L-shaped stator teeth 73 form a double air-gap with the ring-shaped hysteresis rotor 66. The permanent magnet provides a bias flux to the hysteresis ring through the collector plate. It should be appreciated that the hysteresis rotor does not require any salient structures along the circumferential direction. In other words, the rotor 66 is geometrically axi-symmetric.

At the center of the stator is a circular space to accommodate the impeller housing. All teeth of the stator face inwards and form an air gap with the hysteresis rotor. In operation, the impeller is levitated inside the housing and rotates about a z axis. As the impeller rotates, the fluid entering the impeller center is pressurized by the impeller vanes. The fluid is then pushed radially through the volute structure to the pump outlet 60b. The impeller has a through-hole at the center for purging purpose, for example to prevent blood stagnation and clotting. The high-pressure at the impeller circumference pushes the fluid through the bottom gap followed by the central hole until the fluid reaches the pump inlet. This recirculation can prevent the stagnation of the fluid, which is undesirable as it can lead to clots when the device is used for pumping a bio-sample such as blood. The stator teeth are wrapped by windings, through which electric currents flow to induce two sets of magnetic flux: (1) a motor flux; and (2) a suspension flux.

It should be appreciated that a variety of different winding configurations maybe used. For example, one winding configuration which may be used to generate the two sets of flux is such that each of the stator teeth has a set of concentrated windings comprising a motor winding and another set of concentrated windings comprising a suspension winding. The motor windings can be provided in a poly-phase configuration to generate a revolving multi-pole magnetomotive force (MMF) wave. The suspension winding can be provided having two phases in which one phase is disposed to steer the PM bias flux along x-direction and the other phase is disposed to steer the PM bias flux along y-direction. In this embodiment, outer windings denoted may correspond to the motor winding and the inner windings may correspond to the suspension winding. As will be discussed in greater detail below in conjunction with FIG. 9, the motor and suspension windings, respectively generate motor flux and suspension flux. In this winding configuration, the flux superposition occurs outside of the windings in the magnetic circuit.

An alternative winding configuration may also be used. In this configuration, each stator tooth has a single concentrated winding. Each winding may be independently drivable with a current-controlled (transconductance) power amplifier. As will be discussed in greater detail below in conjunction with FIG. 10, a multi-input multi-output controller may directly modulate the current through all of the windings independently so as to make the resultant flux pattern similar to that generated by the two-set winding system. The control block diagram associated with this winding configuration (combined winding) is shown in FIGS. 2 and 10 with FIG. 2 being an exploded version of FIG. 10 and with FIG. 2 being a more detailed version of FIG. 10). In this case, the field superposition happens inside the controller. The independently controllable winding system gives more freedom in controller design, although it requires a larger number of power electronics.

The two winding configurations explained above have concentrated windings on the stator teeth. In some applications such a concentrated winding configuration may be preferred while in other applications the windings can be distributed over the stator along a circumferential direction to generate a more sinusoid-like MMF wave pattern on the stator surface.

Figure 4B:
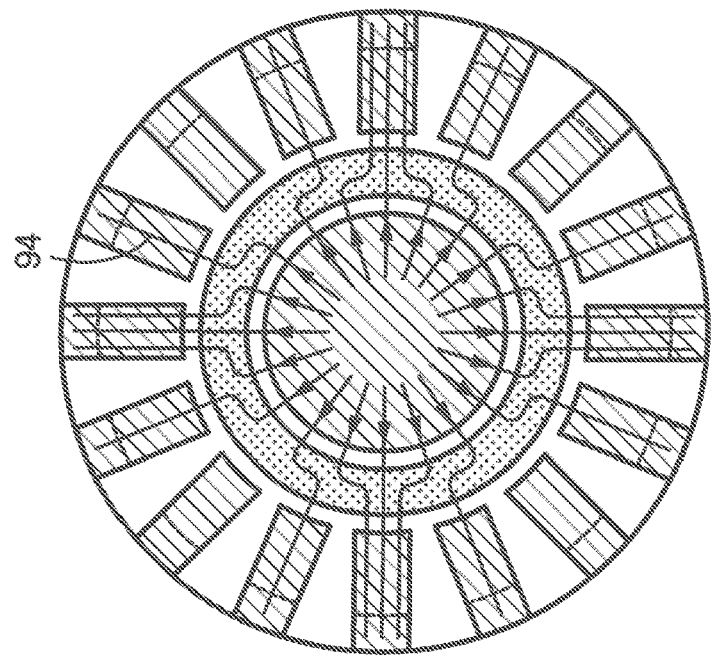
FIGS. 4A, 4B are cross-sectional views of the fluid pump of FIG. 4 taken along lines T-T of Fig. which illustrate example flux patterns.
Figure 4A:
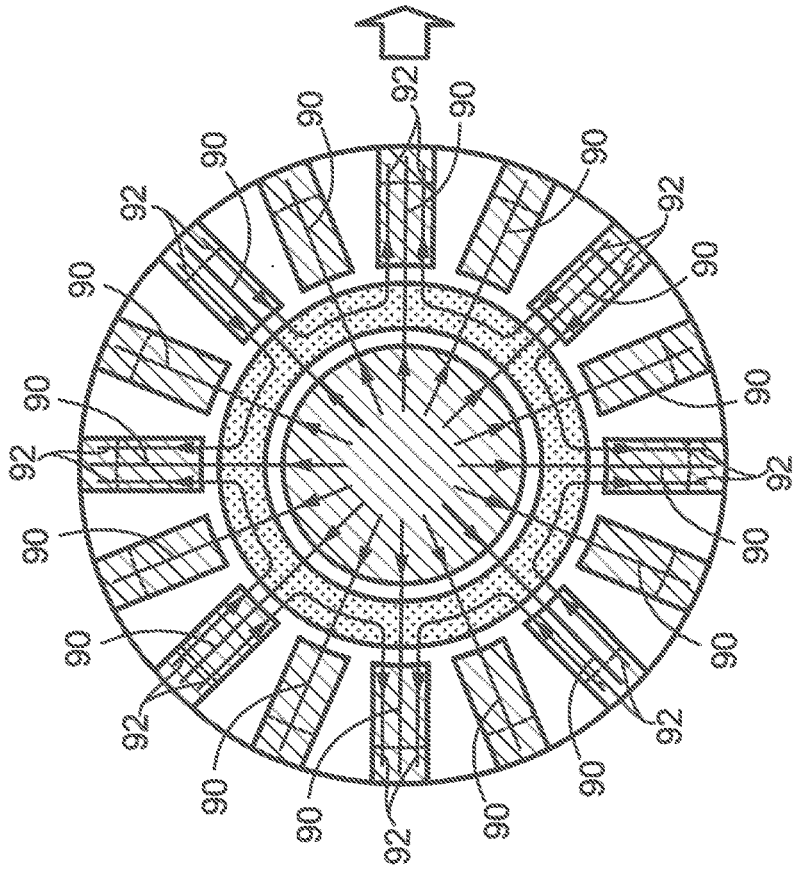

Referring now to FIGS. 4A-4D, an example flux pattern through the hysteresis ring (taken across line T-T in FIG. 4) is shown. FIG. 4A, shows a PM-induced homopolar bias flux (indicated by reference numeral 90) and the stator-induced eight-pole motor flux (indicated by reference numeral 92). FIG. 4B shows the resultant flux pattern 94, which is homopolar and periodic.

FIGS. 4A, 4B thus illustrate an example flux pattern through the hysteresis ring (section T-T in FIG. 4). The winding configurations explained above in conjunction with FIG. 4 are all applicable to generate this flux pattern. In FIG. 4A, a homopolar bias flux induced by the permanent magnet emanate from a collector plate, passes through the hysteresis ring, and reaches the stator teeth. As the stator generates an eight-pole magnetomotive force (MMF) on the rotor, the eight-pole motor flux pattern 92 is induced and superposed on the PM-induced bias flux 90. The motor flux effectively steers the PM-induced flux on the plane, thereby leading to the resultant flux pattern 94 shown in FIG. 4B. By passing poly-phase electric currents through the motor winding, the stator can generate a traveling MMF wave around the hysteresis rotor, which rotates the eight-pole motor flux 92 as well as the resultant flux pattern 94 about a z axis. The rotating flux pattern 94 generates a torque on the rotor based on the principle of hysteresis motor.

The MMF wave is temporally periodic and also spatially periodic along the circumferential direction. The traveling MMF wave induces motor flux on the hysteresis rotor according to the hysteretic B-H relation of the rotor. The rotor is initially unmagnetized, and becomes magnetized due to the excitation of the stator. Due to the hysteresis, the induced flux tends to be persistent on the rotor and lags behind the MMF wave. The interaction between the MMF wave and the induced flux generates a torque on the rotor. Although some example embodiments described herein illustrate a two-phase winding system as an example, those of ordinary skill in the art will appreciate that it is also possible to implement other poly-phase winding configurations. The windings can be arranged so as to generate a rotating flux pattern with poly-phase input currents. It should be appreciated that the motor flux 92 of any 2n-pole (n≥2, n is integer) other than that shown in the example of FIG. 4A can be used to generate a torque.

Figure 4C:
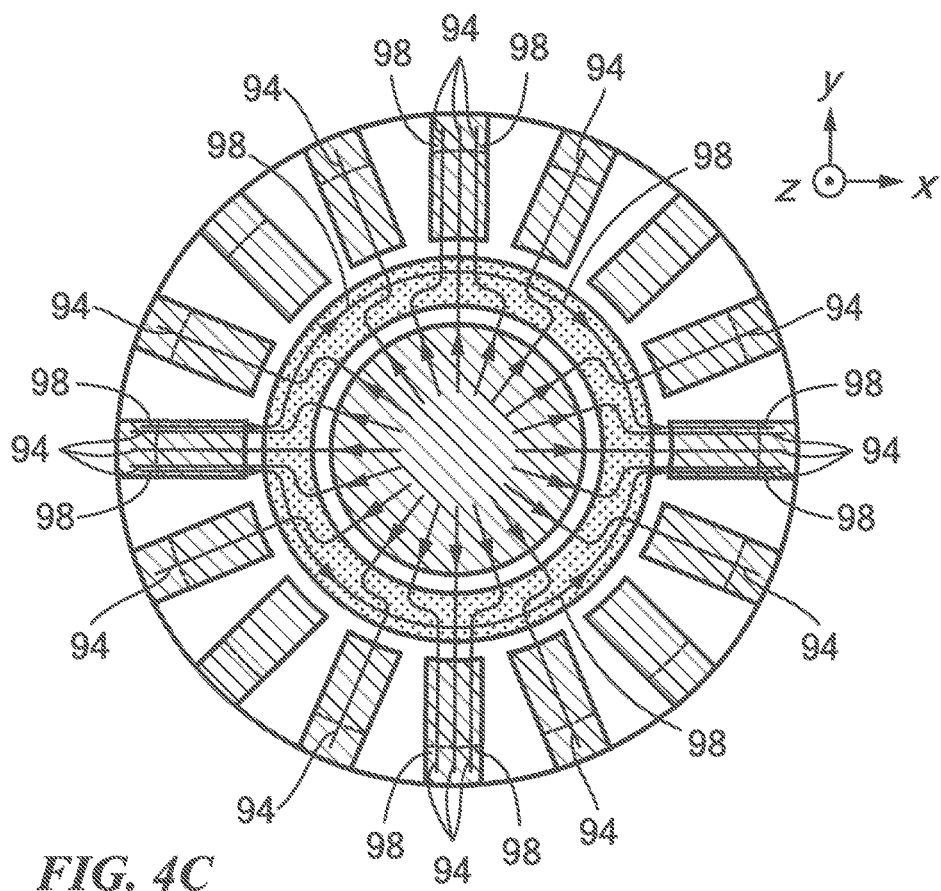
FIG. 4C is a cross-sectional view of the fluid pump of FIG. 4 taken along lines T-T which illustrates suspension force generation.
Figure 4D:
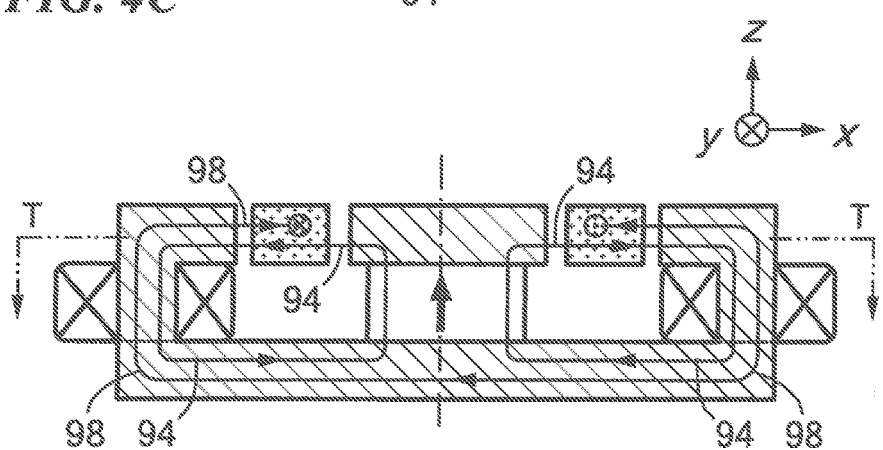
FIG. 4D is a cross-sectional view of a portion of the fluid pump of FIG. 4 which illustrates suspension force generation.

Referring now to FIGS. 4C, 4D, an illustration of suspension force generation is shown. The resultant flux pattern 94 applies radially attractive forces when the rotor is off-centered. This destabilizing force is often modeled as a negative stiffness. In order to impose positive centering forces to override the negative stiffness, and thereby suspend the rotor at the stator center in a stable manner, the stator additionally induces suspension flux on the rotor 98. A resultant periodic homopolar flux is represented by reference numerals 94 (PM flux+eight pole motor flux) and lines labeled with reference numerals 98 represent the two-pole suspension flux.

FIG. 4C shows the flux pattern through the top hysteresis rotor (taken through section T-T in FIG. 4). In addition to the motor flux, the stator also generates a two-pole suspension flux, indicated in FIGS. 4C, 4D as lines 98 to actively control the radial displacements of the rotor based upon the position measurements. The suspension flux 98 superposed on the sum of the motor flux and the PM bias flux 96 generates radial suspension forces. The resultant homopolar flux (represented as lines 94 in FIGS. 4C, 4D) is the sum of motor flux and PM-induced flux. The PM-induced bias flux also increases the passive stiffness of the rotor in three degrees of freedom (z, $\theta_x$, $\theta_y$). Except for the rotation about the z axis ($\theta z$), which is driven by the hysteresis motor, the remaining three degrees of freedom (z; θx; θy) are passively stable due to the reluctance force generated by the bias flux. The rotor in a thin disk-shape can enhance the passive stability in two tilting degrees of freedom (θx, θy).

Referring now to FIG. 5 an integrated pump-exchanger 80 having an inlet 80*a* and an outlet 80*b* includes biasing permanent magnets located peripheral of a stator. It should be appreciated that the embodiment of FIG. 5 is a variation not the embodiment described above in conjunction with FIG. 4 in terms of bias location and pump design. Accordingly, the stator structure is changed such that the top layer of the stator is provided having flat-teeth and the stator is coupled to a circular back iron yoke. A collector column is provided from a soft magnetic material which provides a low reluctance path for the PM-induced bias flux. After reading the description provided herein, it will now be apparent to those of ordinary skill in the art that various changes and modifications in form and details may be made therein without departing from the spirit and scope of the concepts.

Figure 6:
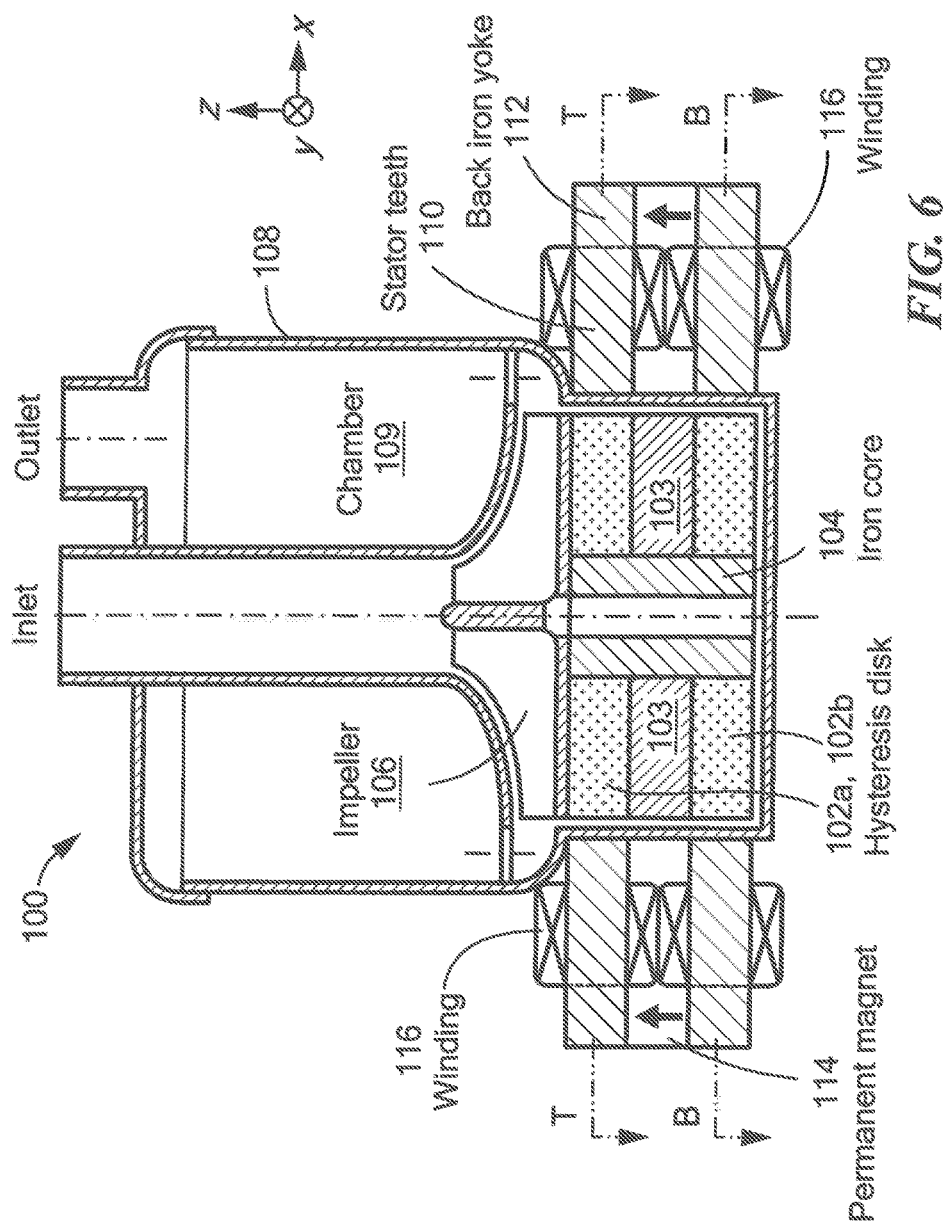
FIG. 6 is a side cross-sectional view of a fluid pump having a stator and a double hysteresis rotor flux-biased by one or more peripherally located permanent magnets.

Referring now to FIG. 6, an embodiment of a pump 100 based upon a PM-biased stator and a double hysteresis rotor includes a rotor provided from two hysteresis disks 102*a*, 102*b*, separated by a non-magnetic material 103. At the center of the rotor is a soft magnetic core 104. The rotor is embedded in an impeller 106, and the impeller-rotor assembly is contained in a housing 108. The impeller-rotor assembly comprised of the impeller 106, two hysteresis disks 102*a*, 102*b*, and the center core 104 can be provided as a single component of semi-hard magnetic material, for example D2 steel, cast iron, or a magnetic stainless steel. The housing 108 has an integrated chamber 109, in which other fluid circuit components, such as a filter and exchange unit, can be packaged together to form a single disposable module. The stator is provided from two conventional stators, each of which is comprised of multiple teeth 110 connected via a circular back iron yoke 112. Multiple permanent magnets, 114 marked with bold arrows representing a magnetization direction, are arranged between the two circular stator yokes. It should be appreciated that the magnets may be oriented such that the direction of magnetization may be other than that shown in the example of FIG. 6. Windings 116 are coupled to stator teeth 110.

Referring now to FIGS. 6A-6I, shown are illustrative flux patterns for the pump 100 (FIG. 6).

Figure 6B:
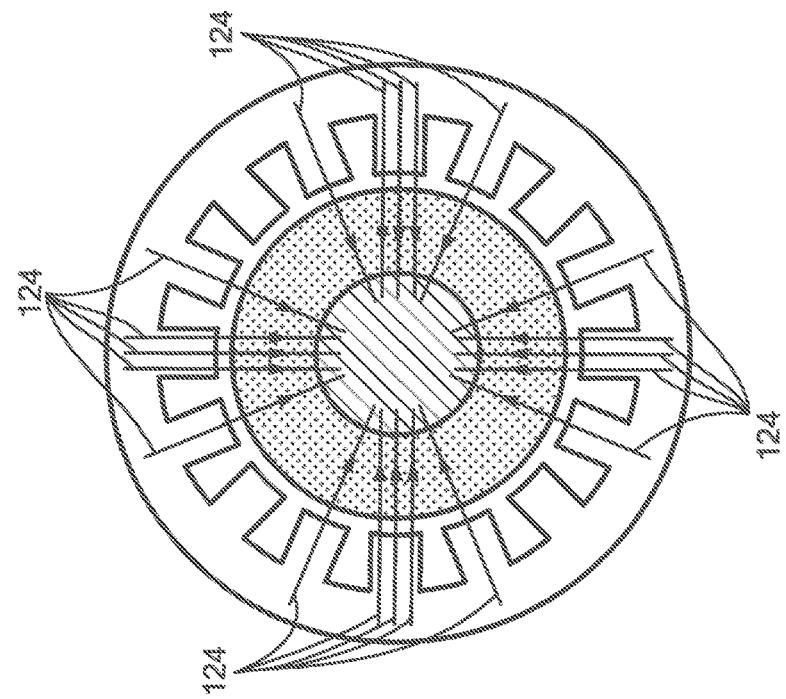
FIGS. 6A, 6B are cross-sectional views of the pump of FIG. 6 taken along lines T-T which illustrate example flux patterns through the top hysteresis rotor of FIG. 6.
Figure 6A:
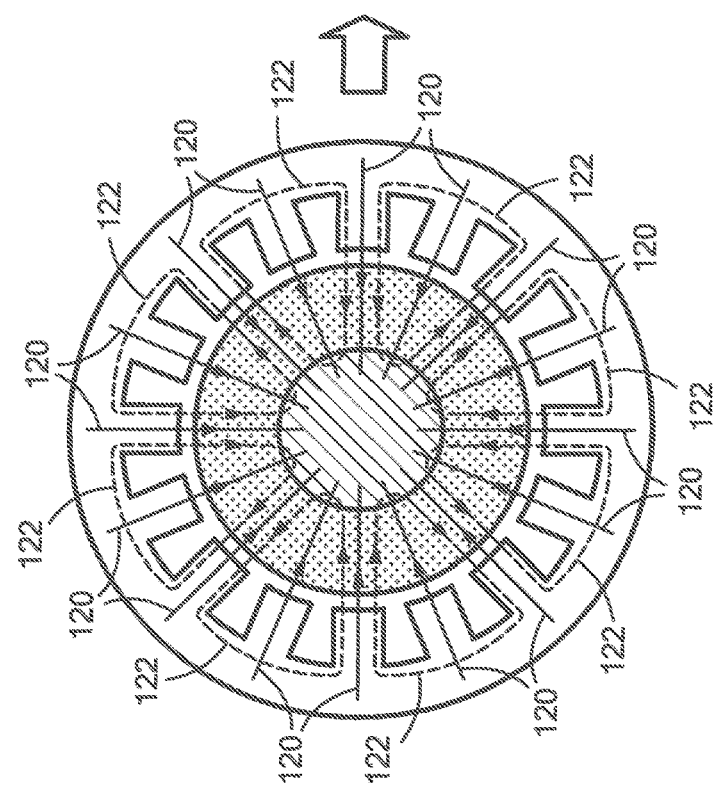

FIGS. 6A, 6B illustrate an example flux pattern through the top hysteresis rotor (i.e. taken through section T-T in FIG. 6). In FIG. 6A, lines labeled with reference numerals 120 represent the permanent magnet flux and lines labeled with reference numerals 122 represent eight-pole motor flux. FIG. 6B, illustrates the resultant flux pattern 124, which is periodic and homopolar.

Figure 6D:
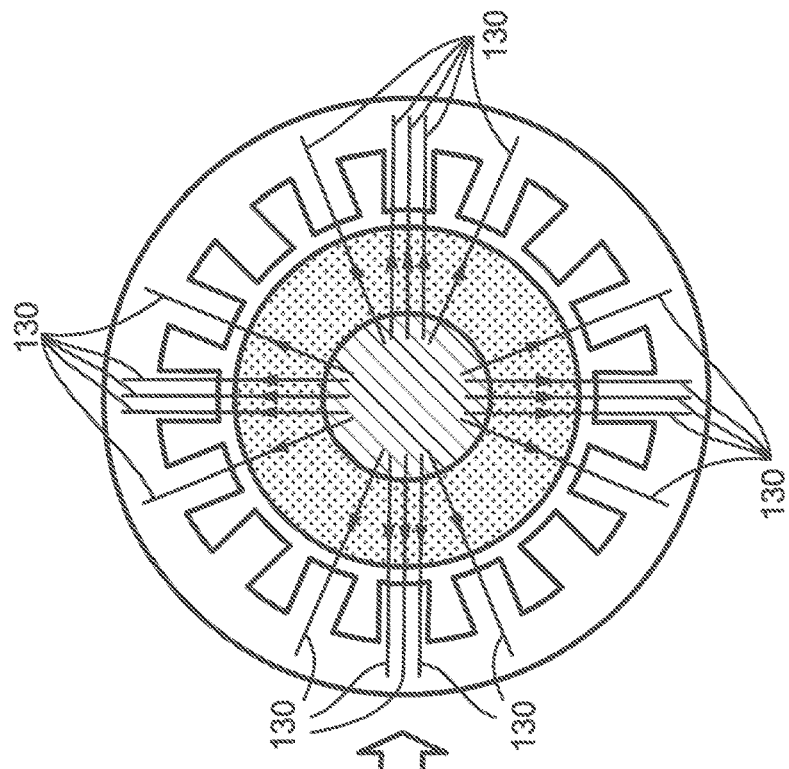
FIGS. 6C, 6D are cross-sectional views of the pump of FIG. 6 taken along lines B-B of FIG. 6 which illustrate example flux patterns through the bottom hysteresis rotor of FIG. 6.
Figure 6C:
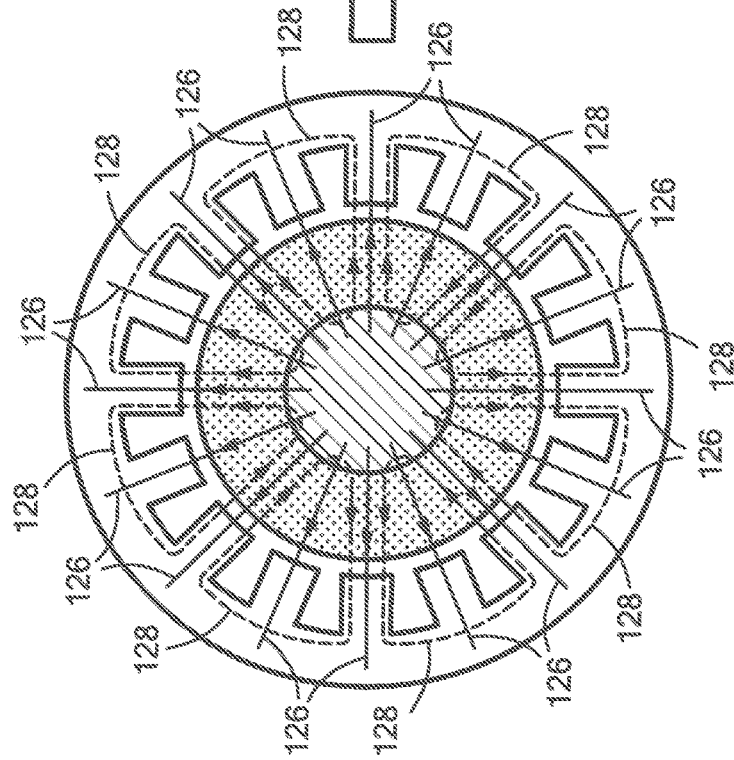

Referring now to FIG. 6C shown is an example flux pattern through the bottom hysteresis rotor (i.e. taken through lines B-B in FIG. 6). In FIG. 6C, lines labeled with reference numerals 126 represent the permanent magnet flux and lines labeled with reference numerals 128 represent eight-pole motor flux. FIG. 6D illustrates the resultant flux pattern, which is periodic and homopolar.

FIGS. 6A-6D thus illustrate an example flux pattern through the top and bottom hysteresis rotors (sections T-T and B-B in FIG. 6). The winding configurations explained above in conjunction with FIG. 4 can be implemented to each of the stators to generate the flux pattern. For the separate motor/suspension winding systems, the motor windings for top and bottom stators can be coupled together in series to share the currents through the windings, thereby automatically generating the anti-symmetric flux pattern.

FIG. 6A shows the pattern of the PM-induced homopolar flux 120 and the eight-pole motor flux 122 induced by the stator winding. These two flux patterns lead to the resultant flux pattern shown in FIG. 6B, which is periodic and homopolar. In some regions, the motor flux cancels out the PM flux, and in other regions the motor flux adds to the PM flux, thereby generating periodic flux patterns along the circumferential direction. That is, the motor flux effectively steers the PM flux on the x-y plane.

It should be noted that the flux pattern on the bottom hysteresis rotor in FIGS. 6C, 6D is anti-symmetric to the flux pattern on the top hysteresis rotor(i.e. the shape of the flux pattern is the same but the direction is the opposite). The mechanism for torque generation is the same as what explained above in conjunction with FIG. 4. Due to the bias flux from the permanent magnet, the stator effectively rotates the resultant homopolar flux pattern as shown in FIGS. 6B and 6D. Therefore, the hysteresis rotor experiences a biased B-H hysteresis loop at the slip frequencies.

FIGS. 6E-6G illustrate suspension force generation. The lines labeled with reference numerals 124 represent the resultant periodic homopolar flux (PM flux+eight pole motor flux) and lines labeled with reference numerals 132 represent the two-pole suspension flux. FIGS. 6E, 6F illustrate the flux pattern through the top hysteresis rotor (section T-T of FIG. 6G) and the bottom hysteresis rotor (section B-B of FIG. 6G).

Figures 6H, 6I:
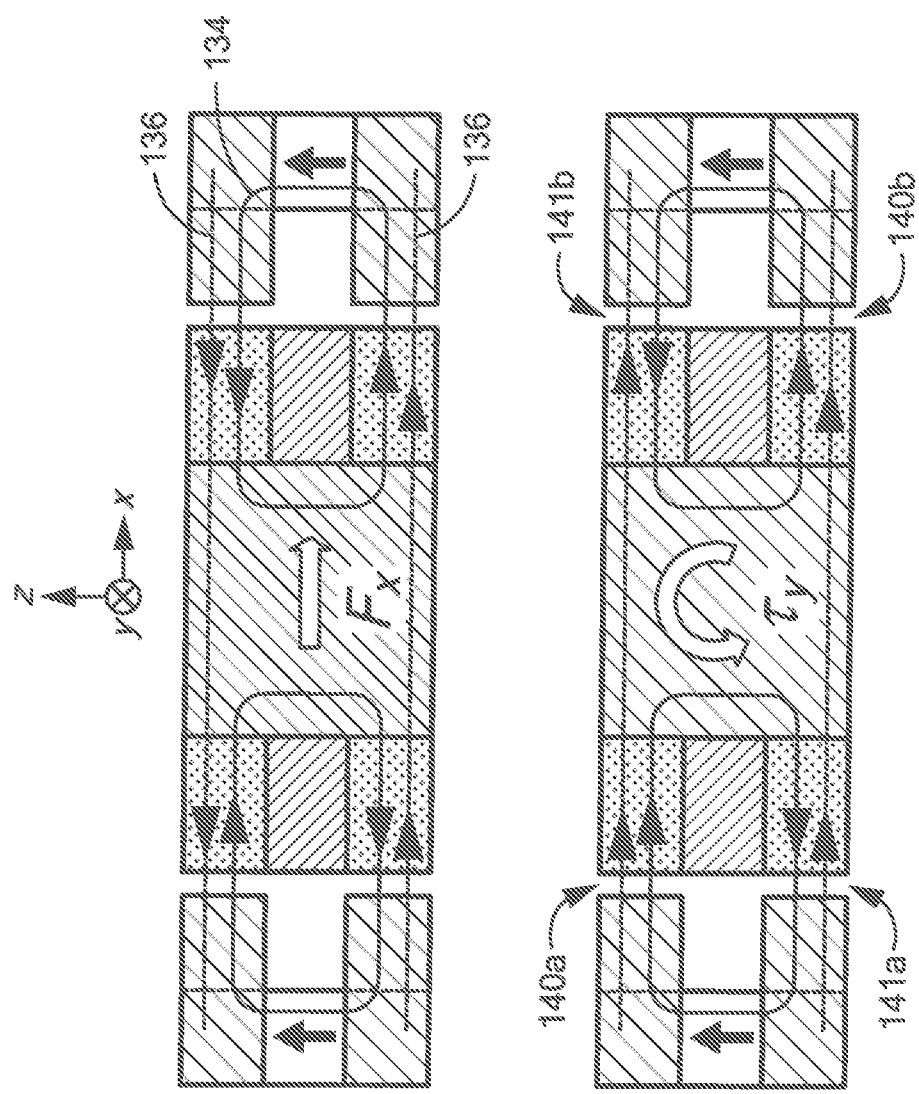
FIGS. 6H, 6I are cross-sectional side views of a portion of fluid pump which illustrates suspension force and torque generation.

FIGS. 6H, 6I illustrate how the stator generates a radial suspension force and a tilting torque by superposing a two-pole suspension flux indicated by lines labeled 134 on the periodic homopolar flux indicated by lines labeled 136. It should be appreciated that the embodiment of FIG. 6 has only one degree of freedom being passively stable/suspended, which is the axial translation. FIGS. 6H, 6I illustrate an embodiment in which two tilting directions are now actively controlled/stabilized/suspended as well as the two radial translations.

FIG. 6H illustrates how the stator generates a radial suspension force. On both the top and bottom hysteresis disks, two sets of flux add up on the positive x direction and cancel out on the negative x direction, thereby generating a net suspension force $F_x$ to the positive x direction. Not shown in the figure, but the stator winding can generate another set of two-pole suspension flux to control the other radial degree of freedom.

As noted above, lines 134 represent the resultant periodic homopolar flux (PM flux+motor flux) and lines 136 represent the suspension flux. FIG. 6H illustrates a radial force generation and FIG. 6I illustrates a tilting torque generation. By implementing separate suspension windings for the top and bottom layer of the stator, the entire stator can independently modulate the suspension flux through each hysteresis disk so as to generate a tilting torque as illustrated in FIGS. 6H, 6I. The motor windings of the two stators can be coupled together in series to share the currents so as to automatically generate anti-symmetric motor flux pattern. As can be seen in FIG. 6I, field strengthening occurs at the top-left and bottom-right corners 140a, 140b and field weakening occurs at the bottom-left and top right corners 141a, 141b on the rotor, and thereby the whole stator generates a tilting torque $T_y$ on the rotor. The stator can generate a tilting torque $T_x$ in a similar way. Therefore, the stator can actively regulate the four displacements, x, y, $\theta_x$ and $\theta_y$, at the expense of position measurements on four degrees of freedom. The remaining rotational degree of freedom $\theta_z$ is driven by the hysteresis motor and the remaining translational degree of freedom z is passively stable due to the reluctance force.

Figure 7:
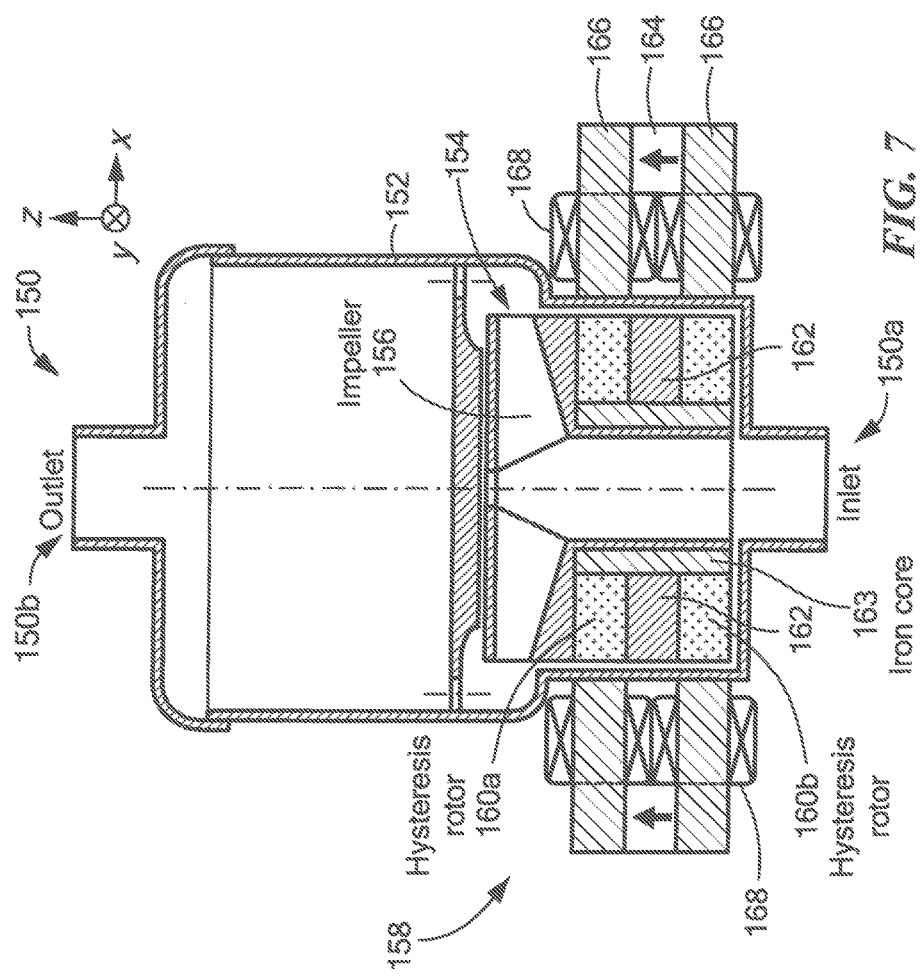
FIG. 7 is a cross-sectional view of an embodiment of a fluid pump having a stator and a double hysteresis rotor flux-biased by one or more peripherally located permanent magnets and a closed-type impeller integrated with the rotor.

Referring now to FIG. 7 a pump 150 having an inlet 150a and an outlet 150b includes a housing 152 having an impeller assembly 154 disposed therein. Impeller assembly 154 includes an impeller 156 integrated (or embedded) in a rotor 158. Impeller 156 is provided as a closed type impeller and rotor 158 is provided as a double hysteresis rotor 158 comprising two hysteresis disks 160a, 160b separated by non-magnetic material 162. An iron core 163 is disposed about a central portion of the impeller 156. The impeller assembly comprised of the impeller 156, two hysteresis disks 160a, 160b, and the center core 163 can be provided as a single, semi-hard magnetic material, for example a cast iron. Peripherally located permanent magnets 164 are disposed on outer portions of a stator 166 and outside windings 168. In this embodiment the closed-type impeller is integrated (or embedded) in the rotor at the output downstream.

Figure 8:
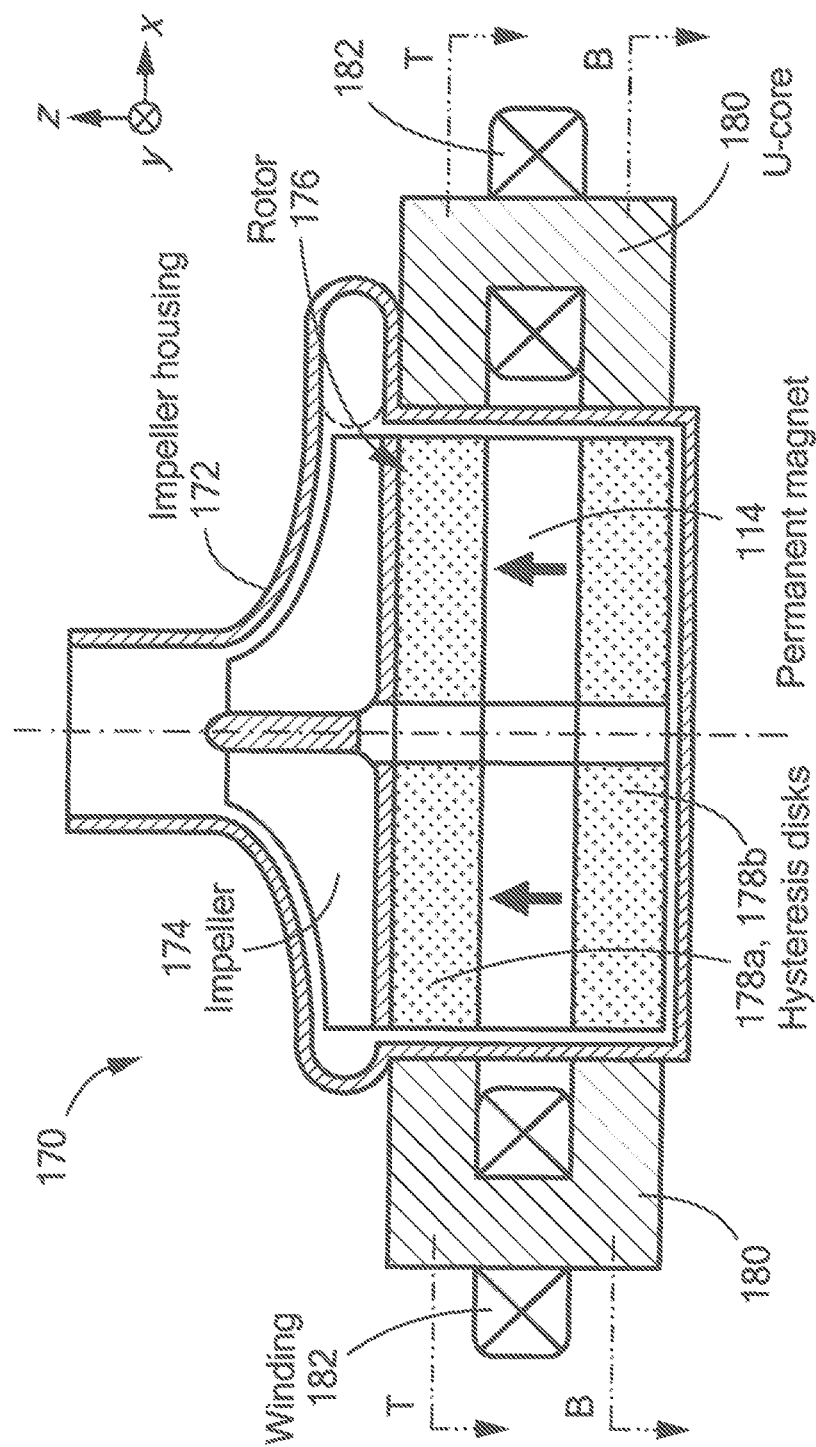
FIG. 8 is a cross-sectional view of an embodiment of a fluid pump having a segmented stator and a double hysteresis rotor flux-biased by a permanent magnet disposed between a pair of hysteresis rotor disks.

Referring now to FIG. 8, a pump 170 includes an impeller housing 172 having an impeller assembly 172 disposed therein. Impeller assembly 172 includes an impeller 174 integrated (or embedded) in a rotor 176. Rotor 176 is provided as a double hysteresis rotor 176 comprising first and second hysteresis disks 178a, 178b. The rotor thus comprises two layers of hysteresis disks, which are separated by an axially-magnetized permanent magnet. The rotor is embedded in the impeller, and the rotor-impeller assembly is contained in the impeller housing. Pump 170 further comprises a segmented stator 180 having concentrated windings 182 coupled thereto. Pump 170 is thus based on a segmented stator and a PM biased double hysteresis rotor. It should be appreciated that the embodiment of FIG. 8 cannot generate torques along the tilting directions, and therefore cannot actively control the two tilting directions. Such embodiments are, of course, possible. It should also be appreciated that the axial thickness of the double hysteresis rotor should be sufficiently small compared to the diameter for this embodiment as in the embodiments in FIGS. 1, 4, and 5.

Referring now to FIGS. 8A, 8B, an example flux pattern through the top hysteresis disk (section T-T in FIG. 8) is shown. In FIG. 8A, lines 186 represent the PM-induced homopolar flux and lines 188 represent the stator-induced eight-pole motor flux. FIG. 8B illustrates the resultant flux pattern 190, which is periodic and homopolar.

Referring now to FIGS. 8C, 8D shown is an example flux pattern through the bottom hysteresis disc (section B-B of the pump shown in FIG. 8). In FIG. 8C, lines 192 represent the PM-induced homopolar flux and lines 194 represent the stator-induced eight-pole motor flux. FIG. 8D, illustrates the resultant flux pattern 196, which is periodic and homopolar.

FIGS. 8A-8D thus illustrate an example flux pattern through the top hysteresis rotor (section T-T in FIG. 8) and bottom hysteresis rotor (section B-B in FIG. 8) respectively. The winding configurations explained in conjunction with FIG. 4 can be implemented to generate the motor flux.

In FIG. 8A, lines 186 represent homopolar flux due to the permanent magnet and lines 188 represent eight-pole motor flux induced by the stator winding. The homopolar flux emanating from the north pole of the PM passes through the top hysteresis disk radially outwards and turns downwards through the U-cores. FIG. 8B illustrates the resultant flux pattern 190. The eight-pole motor flux is superposed on the uniform homopolar PM flux, thereby forming a periodic homopolar flux pattern.

FIGS. 8C, 8D, illustrate the flux pattern on the bottom hysteresis disk (section B-B in FIG. 8), which is anti-symmetric to that of the top layer (i.e. the shape of the flux pattern is the same, but the direction is the opposite). This flux pattern automatically arises from the symmetry of the rotor-stator magnetic circuit.

In FIG. 8C lines 192 represent homopolar flux due to the permanent magnet and lines 194 represent eight-pole motor flux induced by the stator winding. The PM-induced homopolar flux passes through the bottom hysteresis disk radially inwards and returns to the south pole of the PM.

FIG. 8D illustrates the resultant flux pattern 196. The eight-pole motor flux is superposed on the uniform PM flux to form a periodic homopolar flux pattern. The mechanism for torque generation is the same as that explained above in conjunction with FIG. 4. Due to the bias flux from the permanent magnet, the stator effectively rotates the resultant homopolar flux pattern as illustrated in FIGS. 8B and 8D.

Therefore, the hysteresis rotor experiences a biased B-H hysteresis loop at the slip frequencies. Although embedding permanent magnets in the rotor is not a favorable approach for disposable rotors due to the extra cost, it can be used to enhance the passive stiffness.

FIGS. 8E-8G illustrate suspension force generation. Lines 190, 196 represent the resultant homopolar flux (PM 30 motor flux) and lines 198 represent the suspension flux. FIGS. 8E, 8F illustrate the flux pattern on the top hysteresis disk (section TT) and the bottom hysteresis disk (section B-B respectively).

FIG. 8G illustrates how the stator generates radial forces by superposing a suspension flux 198 on the periodic homopolar flux 200. Here, the two sets of flux add in regions 202a, 202b and cancel in regions 203a, 203b, thereby generating a suspension force to the right. The winding configurations explained above in conjunction with FIG. 4 are applicable to generate the suspension flux. Not shown in the figure, but the stator windings generate another set of two-pole suspension flux to control the other radial degree of freedom.

The mechanism for the suspension force generation is similar to that explained above in conjunction with FIG. 4. The resultant homopolar flux 200 is the sum of motor flux and PM-induced flux. The PM-induce bias flux increases the passive stiffness of the rotor in three degrees of freedom (z, $\theta_x$, $\theta_y$).

Referring now to FIG. 9, an example system diagram of a homopolar, self-bearing hysteresis rotary pump 204 illustrates electrical connections of the pump—i.e. windings exposed (i.e. pulled out of the pump) to show the electrical connection. Two sets of windings, a motor winding 206a and a suspension winding 206b, generally denoted 206 are implemented separately. The homopolar self-bearing hysteresis rotary pump is preferably integrated with sensors 208, controllers 210, and power amplifiers 212 to form a feedback system.

In FIG. 9, $\omega_{z,\,ref}$ represents the reference rotational speed, $x_{ref}$ represents the reference radial position in the x direction, $y_{ref}$ represents the reference radial position in the y direction, $\omega_{z,mes}$ is the measured rotational speed, $X_{mes}$ represents the measured radial position in the x direction, and $Y_{mes}$ represents the measured radial position in the y direction. The controller processes these six input signals to compute control signals: $u_A$, $u_B$, $u_C$, $u_a$, $u_b$ and $u_c$.

In response to signals provided thereto from controller 210, the current-control (transconductance) amplifiers generally, denoted 212, drive electrical currents $i_A$, $i_B$, $i_C$, $i_a$, $i_b$ and $i_c$ through windings 206. The windings 206 comprise motor winding 206a and suspension winding 206b. The controller 210 modulates the control signals $u_A$, $u_B$ and $u_C$ to drive the currents $i_A$, $i_B$, and $i_C$ through the motor winding 206a. The motor winding 206a is disposed on the stator teeth in such a way that the currents through it generate a rotating multi-pole magnetomotive force (MMF) wave. The controller 210 also modulates the control signals $u_a$, $u_b$ and $u_c$ to drive the currents ia, ib, and ic through the suspension winding 206b. The suspension winding 206b is disposed on the stator teeth in such a way that the current through it generates two-pole suspension flux.

Although the system diagram in FIG. 9 shows a three-phase winding configuration for the motor and suspension windings (i.e. phases A, C, B and phases a, b, c respectively), it should be appreciated that any other poly-phase configurations for each of the windings may also be used. In one illustrative embodiment, two phases were used for the suspension winding, and the motor winding can be any poly-phase configurations (e.g. two, three, etc.). The radial displacements of the rotor can be measured either with commercial sensors, such as capacitance sensors and eddy-current sensor, or with sensing coils, integrated together with the stator winding, that generates electric potential difference as responding to the high-frequency component of magnetic flux linking to the sensing coil. The later type of sensing technique is often called self-sensing. Such approach can use the motor coils themselves, or use additional sensor windings located on or separately from the stator yokes (poles, teeth, or back iron).

In prior art systems, self-sensing is usually based upon inductance variation caused by highly permeable rotor's displacement. As the air-gap between the rotor and the stator increases, the reluctance across the air-gap increases and the associated inductance decreases. However, this technique is not favorable for the hysteresis rotors described herein because of the core loss and non-linearity from the hysteresis phenomenon.

Rather, with the system described herein, it is possible to increase the operating frequency of the sensing magnetic flux so that the magnetic flux circumvents around the rotor along the circumferential direction through the air-channel between the rotor and the stator. This is because the finite conductivity of the hysteresis rotor surface shields out the high frequency magnetic fields, such that the flux travels along the air-channel and return through the other part of the stator winding. In this case, a wider gap between the rotor and the stator decreases the reluctance through the air-channel, thereby increasing the associated inductance. Since the geometry of the air-channel is a function of rotor displacement, and the permeability of the air is linear over a wide frequency range, this technique can lead to high bandwidth position measurement with better linearity compared with prior art techniques. This high-frequency flux is not significantly affected by the non-linear constitutive law of the material inside the rotor. Instead, surface characteristics, especially electric conductivity is an important factor.

In embodiments, the hysteresis rotor can be contained in a stainless steel casing to increase the surface conductivity as well as prevent corrosion. The rotational speed of the rotor can be measured with commercial sensors, such as optical tachometers and encoders, and fed back to a controller, or other means, to regulate the rotational speed of the hysteresis rotor.

Referring now to FIG. 10, in which like elements of FIG. 9 are provided having like reference designations, a system diagram of a homopolar, self-bearing hysteresis rotary pump 220 illustrates electrical connections of the pump (i.e. as in FIG. 9, windings are exposed to illustrate the electrical connections). An independently drivable winding 222a-222n generally denoted 222 is placed for each of the magnetic poles. Thus, the two-set winding system in the embodiment of FIG. 9 is replaced by independently drivable windings in the embodiment of FIG. 10. The stator can induce a maximum of N numbers of magnetic poles around the rotor circumference, and modulate their intensity independently.

While particular embodiments of concepts, systems, circuits and techniques have been shown and described, it will be apparent to those of ordinary skill in the art that various changes and modifications in form and details may be made therein without departing from the spirit and scope of the concepts, systems and techniques described herein. For example, some of the presented implementation examples show a system with a hysteresis rotor having a single hysteresis disk. It will be appreciated that the concepts described herein can be used in a system with a hysteresis rotor having a plurality of hysteresis disks. Also, although single magnets may be used in some embodiment, in other embodiments, a plurality of magnets may be used and may be centrally or peripherally located with respect to a stator. Also a wide variety of different winding configurations may be used. Other combinations or modifications are also possible all of which will be readily apparent to one of ordinary skill in the art after reading the disclosure provided herein.

Accordingly, having described preferred embodiments which serve to illustrate various concepts, systems circuits and techniques, which are the subject of this patent, it will now become apparent to those of ordinary skill in the art that other embodiments incorporating these concepts, systems circuits and techniques may be used. For example, it should be noted that individual concepts, features (or elements) and techniques of different embodiments described herein may be combined to form other embodiments not specifically set forth above. Furthermore, various concepts, features (or elements) and techniques, which are described in the context of a single embodiment, may also be provided separately or in any suitable sub-combination. It is thus expected that other embodiments not specifically described herein are also within the scope of the following claims.

In addition, it is intended that the scope of the present claims include all other foreseeable equivalents to the elements and structures as described herein and with reference to the drawing figures. Accordingly, the subject matter sought to be protected herein is to be limited only by the scope of the claims and their equivalents.

It should thus be appreciated that elements of different embodiments described herein may be combined to form other embodiments which may not be specifically set forth herein. Various elements, which are described in the context of a single embodiment, may also be provided separately or in any suitable sub-combination. Other embodiments not specifically described herein are also within the scope of the following claims.

It is felt, therefore that the concepts, systems, circuits and techniques described herein should not be limited by the above description, but only as defined by the spirit and scope of the following claims which encompass, within their scope, all such changes and modifications.

All publications and references cited herein are expressly incorporated herein by reference in their entirety.

What is claimed is:

1. A homopolar flux-biased hysteresis bearingless motor comprising:
   (a) a stator comprising a bottom plate and a plurality of teeth projecting from said bottom plate;
   (b) a flux-biasing structure disposed in a central portion of said stator and having a shape selected such that said stator and said flux-biasing structure define a space having a predetermined shape;
   (c) a hysteresis rotor disposed in the space defined by said flux-biasing structure and stator;
   (d) stator windings coupled to said stator teeth and through which electric current may flow to induce two sets of magnetic flux on said hysteresis rotor said two sets of flux corresponding to (1) a motor flux; and (2) a suspension flux; and
   (e) means for providing a homopolar bias flux which traverses through said hysteresis rotor radially and returns via the stator teeth and the bottom plate of said stator and wherein said stator windings are configured to superpose a motor flux and a suspension flux on the homopolar bias flux to generate a torque and a radial force.

2. The homopolar flux-biased hysteresis bearingless motor of claim 1 wherein:
   (a1) said stator teeth are provided having an L-shape; and
   (a2) said flux-biasing structure is provided as an inner central flux-biasing structure which forms with said stator teeth an annular space having dimensions selected to accept said hysteresis rotor.

3. The homopolar flux-biased hysteresis bearingless motor of claim 1 wherein:
   said stator teeth and said bottom plate are provided from a soft magnetic material having lamination to reduce eddy-current loss;
   said flux-biasing structure is provided from one of: a soft magnetic material and a semi-hard magnetic material having a level of hysteresis;
   said rotor is provided from a semi-hard magnetic material having some level of hysteresis.

4. The homopolar flux-biased hysteresis bearingless motor of claim 2 wherein:
   (e1) said means for providing a homopolar bias flux comprises a permanent magnet disposed such that the homopolar bias flux provided by said permanent magnet traverses through the hysteresis rotor radially and returns via the teeth and the bottom plate of said stator.

5. The homopolar flux-biased hysteresis bearingless motor of claim 2 wherein:
   (e1) said means for providing a homopolar bias flux comprises a permanent magnet disposed such that a radially inward homopolar bias flux provided by said permanent magnet traverses through the hysteresis rotor, the stator teeth and the bottom plate of said stator.

6. The homopolar flux-biased hysteresis bearingless motor of claim 1 wherein said stator further comprises at least one of:
   (a4) windings disposed to superpose a 2-pole suspension flux on the bias flux to generate a radial force on the hysteresis rotor in a first desired direction; and
   (a5) windings disposed to superpose a 2-pole suspension flux on the bias flux to generate a radial force on the hysteresis rotor in a second desired direction which is orthogonal to the first direction.

7. The homopolar flux-biased hysteresis bearingless motor of claim 6 wherein said windings are disposed such that the superimposed 2-pole suspension flux is added to the homopolar flux in a first direction and subtracted from the homopolar flux in a second opposite direction, thereby generating a differential magnetic force on said hysteresis rotor.

8. The homopolar flux-biased hysteresis bearingless motor of claim 1 further comprising:
   two or more position sensors disposed to sense at least radial positions of said hysteresis rotor; and
   a controller coupled to said two or more sensors such that in response to signals provided thereto from said two or more sensors, said controller regulates the strength of the flux based upon the rotor position to provide stable suspension of said hysteresis rotor.

9. The homopolar flux-biased hysteresis bearingless motor of claim 1 further comprising two or more sensors disposed in relation to said rotor so as to measure at least radial displacements of said hysteresis rotor.

10. The homopolar flux-biased hysteresis bearingless motor of claim 9 wherein the two or more sensors are provided as one of: a tachometer; an encoder; a capacitance sensor; an eddy-current sensor; or one or more sensing coils integrated together with the stator winding that generate electric potential difference as responding to the high-frequency component of magnetic flux linking to the sensing coil.

11. The homopolar flux-biased hysteresis bearingless motor of claim 10 further comprising a controller coupled to said two or more sensors such that in response to signals provided thereto from said two or more sensors, said controller regulates the strength of the flux based upon the rotor position to provide stable suspension of said hysteresis rotor.

12. The homopolar flux-biased hysteresis bearingless motor of claim 1 wherein said coils are disposed to superpose a 2n-pole rotating flux (n≥3) to generate a torque.

13. A pump comprising:
   (a) a homopolar flux-biased hysteresis bearingless motor comprising:
      a stator comprising a bottom plate and a plurality of teeth projecting from said bottom plate;
      a flux-biasing structure disposed in a central portion of said stator and having a shape selected to define a space having a predetermined shape;
      a hysteresis rotor disposed in the space defined by said flux-biasing structure and stator;
      stator windings coupled to said stator and through which electric current may flow to induce two sets of magnetic flux: (1) a motor flux; and (2) a suspension flux; and
      a permanent magnet for providing a homopolar bias flux which traverses through said hysteresis rotor radially and returns via the teeth and the bottom plate of the stator and wherein said stator windings are configured to superpose a two-pole suspension flux on the homopolar bias flux to generate a radial force; and
   (b) an impeller assembly disposed in relation to said stator in the space defined by said flux-biasing structure and said stator teeth, said impeller assembly comprising an impeller; and
      a hysteresis rotor coupled to said impeller.

14. The homopolar flux-biased hysteresis bearingless motor of claim 13 further comprising:
   two or more position sensors disposed to sense at least radial positions of said hysteresis rotor; and
   a controller coupled to said two or more sensors such that in response to signals provided thereto from said two or more sensors, said controller regulates the strength of the flux based upon the rotor position to provide stable suspension of said hysteresis rotor.

15. The homopolar flux-biased hysteresis bearingless motor of claim 13 further comprising two or more sensors disposed in relation to said rotor so as to measure at least radial displacements of said hysteresis rotor.

16. The homopolar flux-biased hysteresis bearingless motor of claim 15 wherein the two or more sensors are provided as one of: a tachometer; an encoder; a capacitance sensor; an eddy-current sensor; or one or more sensing coils integrated together with the stator winding that generate electric potential difference as responding to the high-frequency component of magnetic flux linking to the sensing coil.

17. The homopolar flux-biased hysteresis bearingless motor of claim 16 further comprising a controller coupled to said two or more sensors such that in response to signals provided thereto from said two or more sensors, said controller regulates the strength of the flux based upon the rotor position to provide stable suspension of said hysteresis rotor.

18. A homopolar flux-biased hysteresis bearingless motor comprising:
   (a) a stator comprising a annular back iron yoke, a plurality of teeth projecting from said back iron yoke
   (b) a flux-biasing structure comprising a bottom place and a flux collector column projecting from said bottom plate and disposed in a central portion of said stator, said flux collector column having a shape selected to define a space having a predetermined shape;
   (c) a hysteresis rotor disposed in the space defined by said flux collector column and said stator teeth;
   (d) stator windings coupled to said stator and through which electric current may flow to induce two sets of magnetic flux: (1) a motor flux; and (2) a suspension flux; and
   (e) a permanent magnet disposed on a peripheral portion of said stator and distal to the stator windings, said permanent magnet disposed to provide a homopolar bias flux which traverses through said hysteresis rotor radially and returns via the back iron yoke of the stator and wherein said stator windings are configured to superpose a two-pole suspension flux on the homopolar bias flux to generate a radial force.

19. The homopolar flux-biased hysteresis bearingless motor of claim 18 wherein:
   (a1) said stator teeth are provided having a flat shape; and
   (a2) said flux collector column of the flux-biasing structure forms an annular space with the stator teeth to accept said hysteresis rotor.

20. The homopolar flux-biased hysteresis bearingless motor of claim 19 wherein said stator further comprises at least one of:
   (a4) windings disposed to superpose a 2-pole suspension flux on the bias flux to generate a radial force in a first desired direction; and
   (a5) windings disposed to superpose a 2-pole suspension flux on the bias flux to generate a radial force in a second desired direction which is orthogonal to the first direction.

21. The homopolar flux-biased hysteresis bearingless motor of claim 20 wherein said windings are disposed such that the superimposed 2-pole suspension flux is added to the homopolar flux in a first direction and subtracted from the homopolar flux in a second opposite direction, thereby generating a differential magnetic force on said hysteresis rotor.

22. The homopolar flux-biased hysteresis bearingless motor of claim 21 further comprising:
   two or more position sensors disposed to sense at least radial positions of said hysteresis rotor; and
   means for regulating the strength of the flux based upon the rotor position to provide stable suspension of said hysteresis rotor.

23. The homopolar flux-biased hysteresis bearingless motor of claim 18 wherein said windings are disposed to superpose a 2n-pole rotating flux (n≥3) to generate a torque.

24. A pump comprising:
   (a) a homopolar flux-biased hysteresis bearingless motor comprising:
      two stators each comprising a plurality of stator teeth and a back iron yoke;
      stator windings coupled to said stator teeth and through which electric current may flow to induce two sets of magnetic flux: (1) a motor flux; and (2) a suspension flux; and
      a permanent magnet disposed between the back iron yokes of said stators and distal to the stator windings, said permanent magnet disposed to provide a homopolar bias flux which traverses from the teeth of one stator through said hysteresis rotor and returns via the teeth the other stator and wherein said stator windings are configured to superpose a two-pole suspension flux on the homopolar bias flux to generate a radial force; and (b) an impeller assembly disposed in a central portion of said stator, said impeller assembly comprising:
an impeller;
an iron core coupled to a central portion of said impeller; and
a double hysteresis rotor coupled to said impeller.

25. The pump of claim 24 wherein said double hysteresis rotor is embedded in said impeller.

26. The pump of claim 25 further comprising a housing having at least an inlet and an outlet, said housing disposed through a central portion of said stator and wherein said impeller-rotor assembly is contained in said housing.

27. A pump comprising:
(a) a homopolar flux-biased hysteresis bearingless motor comprising:
a stator comprising a plurality of stator cores;
stator windings coupled to said stator cores and through which electric current may flow to induce two sets of magnetic flux: (1) a motor flux; and (2) a suspension flux; and
(b) an impeller assembly disposed in a central portion of said stator, said impeller assembly comprising:
an impeller disposed in a central portion of said stator;
a hysteresis rotor coupled to said impeller;
a permanent magnet provided as part of said hysteresis rotor, said permanent magnet disposed to provide a homopolar bias flux which traverses through said hysteresis rotor radially and returns via the stator cores and wherein said stator coils are configured to superpose a two-pole suspension flux on the homopolar bias flux to generate a radial force.

28. The pump of claim 27 wherein said stator cores are provided as U-shaped stator cores and said rotor is provide as a double hysteresis rotor comprising first and second hysteresis disks and wherein said magnet is disposed between the first and second hysteresis disks and wherein said permanent magnet is disposed to provide a homopolar bias flux which traverses through said hysteresis rotor radially outwards and returns via the U-shaped stator cores.

29. A bearingless motor comprising:
a hysteresis rotor provided from a semi-hard magnetic material;
a homopolar flux-biased electromagnet configured to levitate and rotate said hysteresis rotor;
homopolar permanent magnetic flux means for providing a homopolar permanent magnetic flux for biasing said hysteresis rotor, said means configured such that a two-pole flux may be superimposed onto the homopolar permanent magnetic flux to generate suspension forces; and
a multi-pole stator configured to provide a multi-pole stator-induced motor flux imposed upon said hysteresis rotor in addition to the two-pole suspension flux and the homopolar bias flux, said multi-polar stator arranged to generate torque by a hysteretic coupling between said hysteresis rotor and said multi-pole stator.

30. The bearingless motor of claim 29 further comprising a flux-biasing structure forming an annular space in which the hysteresis rotor is disposed such that the hysteresis rotor is spaced from surfaces of the flux-biasing structure and from surfaces of the multi-pole stator by air gaps.

31. The bearingless motor of claim 29 wherein the hysteresis rotor is geometrically axi-symmetric and is free from geometrically salient features.

32. The bearingless motor of claim 29 wherein the semi-hard magnetic material is free from permanent magnetization and presents a hysteretic B-H curve with a finite loop area enclosed by the curve such that a magnetization vector of the semi-hard magnetic material varies in magnitude and direction during operation of the hysteresis rotor.

33. The bearingless motor of claim 29 wherein the multi-pole stator includes a bottom plate and a plurality of teeth projecting from said bottom plate.

34. The bearingless motor of claim 33 further comprising stator windings disposed about each of the plurality of teeth.

35. The bearingless motor of claim 34 wherein the stator windings are configured to generate a motor flux that magnetizes the hysteresis rotor.

36. The bearingless motor of claim 34 wherein the stator windings are configured to superpose a suspension flux.

37. The bearingless motor of claim 30 further comprising a permanent magnet (PM) disposed below the flux-biasing structure and configured to generate a homopolar bias flux.

38. The bearingless motor of claim 35 wherein a magnetization of the PM is oriented in an axial direction to generate the homopolar bias flux.

39. The bearingless motor of claim 33 wherein each tooth of the plurality of teeth comprise one or more coils, wherein each coil includes at least one wire turn.

40. The bearingless motor of claim 39 wherein a set of the one or more coils form a stator winding, and each tooth may comprise one or more sets of coils.

41. The bearingless motor of claim 40 wherein:
the stator winding is a motor winding and/or a suspension winding;
the motor winding is configured to generate a multi-pole motor flux; and
the suspension winding is configured to generate a two-pole suspension flux.

* * * * *